US007518610B2

(12) United States Patent
Iwata

(10) Patent No.: US 7,518,610 B2
(45) Date of Patent: Apr. 14, 2009

(54) DISPLAY APPARATUS, DISPLAY CONTROL APPARATUS, DISPLAY METHOD, AND COMPUTER-READABLE RECORDING MEDIUM RECORDING DISPLAY CONTROL PROGRAM

(75) Inventor: Satoshi Iwata, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 384 days.

(21) Appl. No.: 11/440,039

(22) Filed: May 25, 2006

(65) Prior Publication Data

US 2006/0209092 A1 Sep. 21, 2006

Related U.S. Application Data

(63) Continuation of application No. PCT/JP2004/000696, filed on Jan. 27, 2004.

(51) Int. Cl.

| | |
|---|---|
| ***G06T 11/00*** | (2006.01) |
| ***G09G 3/20*** | (2006.01) |
| ***G09G 5/00*** | (2006.01) |
| ***G09G 5/02*** | (2006.01) |
| ***G06K 9/38*** | (2006.01) |

(52) U.S. Cl. ....................... 345/467; 345/613; 345/589; 345/690; 345/55; 348/791; 382/266

(58) Field of Classification Search ................. 345/613, 345/55, 467, 589, 471–472.3, 628, 596, 469.1, 345/694, 696, 698, 551, 204, 636, 421, 59, 345/77, 72, 63, 617–618; 382/205, 266, 382/299, 301, 162, 167; 353/36; 348/519, 348/557, 630, 790–791, 799

See application file for complete search history.

(56) References Cited

U.S. PATENT DOCUMENTS 5,625,772 A 4/1997 Yamazaki et al.
5,684,510 A * 11/1997 Brassell et al. .............. 345/443

(Continued)

FOREIGN PATENT DOCUMENTS

EP 1 026 659 A 8/2000

(Continued)

OTHER PUBLICATIONS

S. Iwata, "The Character Font which is Easy to Read by Sub-Pixel Rendering", The Institute of Image Information and Television Engineers Magazine, vol. 58, No. 4, pp. 477-479.

(Continued)

*Primary Examiner*—Wesner Sajous
(74) *Attorney, Agent, or Firm*—Westerman, Hattori, Daniels & Adrian, LLP.

(57) ABSTRACT

A display apparatus is designed to make a display corresponding to one pixel through the use of a plurality of rectangular display elements.

The apparatus comprises a multi-gradation character generating unit for generating information on a multi-gradation character image obtained by gradating a character edge portion and an element display control unit for controlling a display state in a display unit on the basis of information on this multi-gradation character image so that the multi-gradation character image is displayed in a state where each of the rectangular display elements constituting the display unit is associated with one or more pixels, thus reducing the quantization error so that character display with high visibility is achievable in the case of display of highly fine characters.

34 Claims, 19 Drawing Sheets

U.S. PATENT DOCUMENTS

| | | | | |
|---|---|---|---|---|
| 5,966,134 | A * | 10/1999 | Arias | 345/589 |
| 6,097,398 | A * | 8/2000 | Numata | 345/603 |
| 6,188,385 | B1 * | 2/2001 | Hill et al. | 345/614 |
| 6,229,521 | B1 * | 5/2001 | Yip | 345/611 |
| 6,421,054 | B1 | 7/2002 | Hill et al. | |
| 6,661,429 | B1 * | 12/2003 | Phan | 345/694 |
| 6,750,875 | B1 * | 6/2004 | Keely, Jr. et al. | 345/613 |
| 7,322,700 | B2 * | 1/2008 | Miyagaki et al. | 353/31 |
| 2002/0060689 | A1 * | 5/2002 | Iwata | 345/55 |
| 2003/0210834 | A1 | 11/2003 | Hitchcock et al. | |
| 2003/0214513 | A1 | 11/2003 | Brown et al. | |

FOREIGN PATENT DOCUMENTS

| | | |
|---|---|---|
| EP | 1174855 A2 | 1/2002 |
| JP | 5-40463 | 2/1993 |
| JP | 9-245181 | 9/1997 |
| JP | 2002-91369 | 3/2002 |
| JP | 2002-526816 | 8/2002 |
| JP | 2002-297086 | 10/2002 |
| JP | 2004-4830 | 1/2004 |
| JP | 2004-4839 | 1/2004 |
| JP | 2004-29598 | 1/2004 |
| WO | WO00/21037 | 4/2000 |

OTHER PUBLICATIONS

International Search Report mailed May 18, 2004 of International Application PCT/JP2004/000696.

S. Iwata, "The Character Font which is Easy to Read by Sub-Pixel Rendering", The Institute of Image Information and Television Engineers Magazine, vol. 58, No. 4, pp. 477-479, Apr. 1, 2004.

Supplementary European Search Report dated Mar. 13, 2008 issued in corresponding European Application No. 04 70 5501, filed on Jan. 27, 2004.

* cited by examiner

FIG. 6A

| LUMINANCE INDICATED VALUE | G'BRIGHTNESS | B'BRIGHTNESS |
|---|---|---|
| 0 | 0 | 0 |
| 1 | 0 | 1 |
| : | : | : |
| 10 | 4 | 10 |
| : | : | : |
| 100 | 38 | 100 |
| : | : | : |
| : | : | : |
| 200 | 77 | 200 |
| : | : | : |
| 256 | 98 | 255 |

FIG. 6B

| LUMINANCE INDICATED VALUE | G'BRIGHTNESS | B'BRIGHTNESS |
|---|---|---|
| 0 | 4 | 10 |
| : | : | : |
| 100 | 37 | 96 |
| : | : | : |
| : | : | : |
| 256 | 98 | 255 |

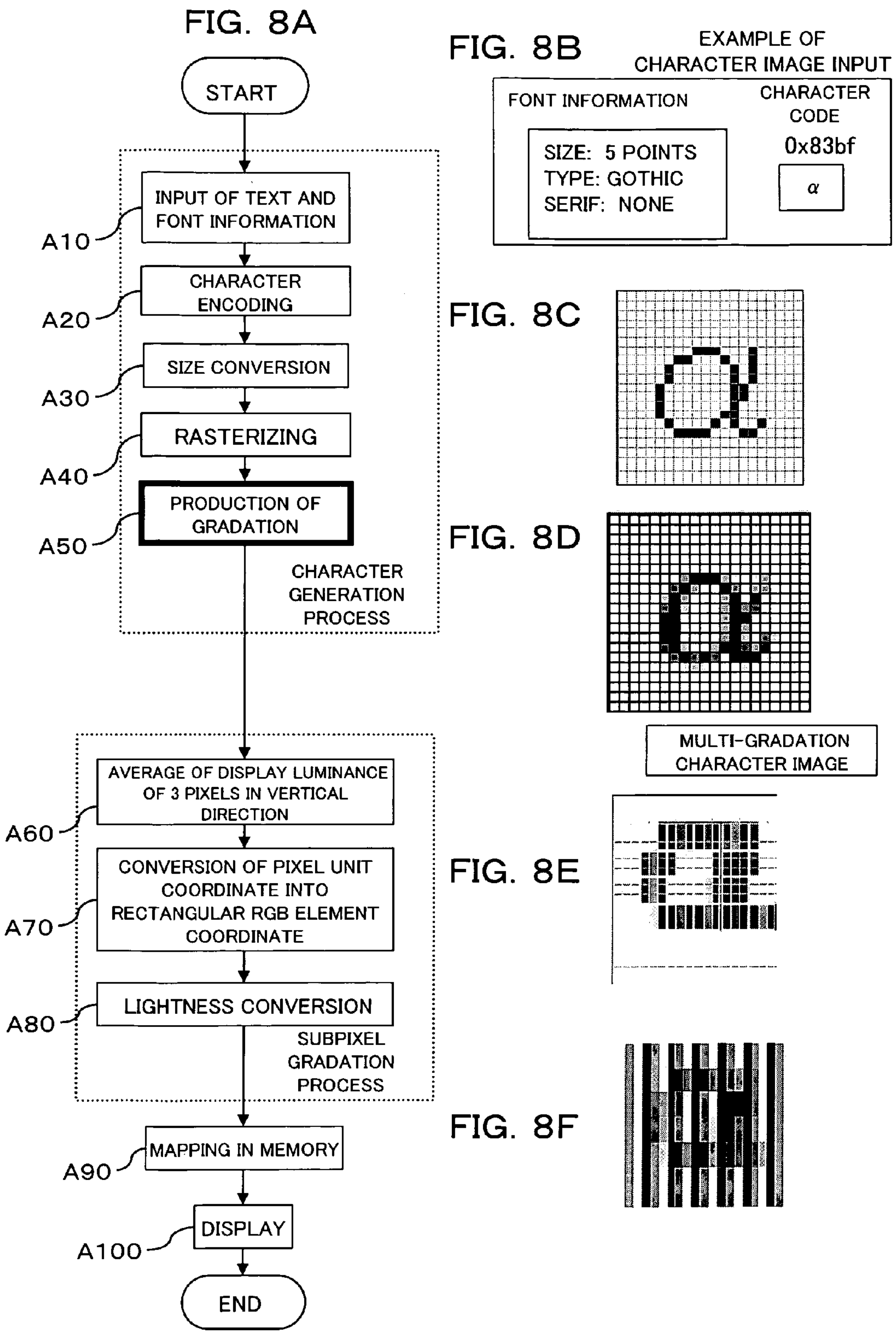
FIG. 8A
START
INPUT OF TEXT AND FONT INFORMATION
A10
CHARACTER ENCODING
A20
SIZE CONVERSION
A30
RASTERIZING
A40
PRODUCTION OF GRADATION
A50
CHARACTER GENERATION PROCESS
AVERAGE OF DISPLAY LUMINANCE OF 3 PIXELS IN VERTICAL DIRECTION
A60
CONVERSION OF PIXEL UNIT COORDINATE INTO RECTANGULAR RGB ELEMENT COORDINATE
A70
LIGHTNESS CONVERSION
A80
SUBPIXEL GRADATION PROCESS
MAPPING IN MEMORY
A90
DISPLAY
A100
END
FIG. 8B
EXAMPLE OF CHARACTER IMAGE INPUT
FONT INFORMATION
SIZE: 5 POINTS
TYPE: GOTHIC
SERIF: NONE
CHARACTER CODE
0x83bf
α
FIG. 8C
FIG. 8D
MULTI-GRADATION CHARACTER IMAGE
FIG. 8E
FIG. 8F FIG. 11A
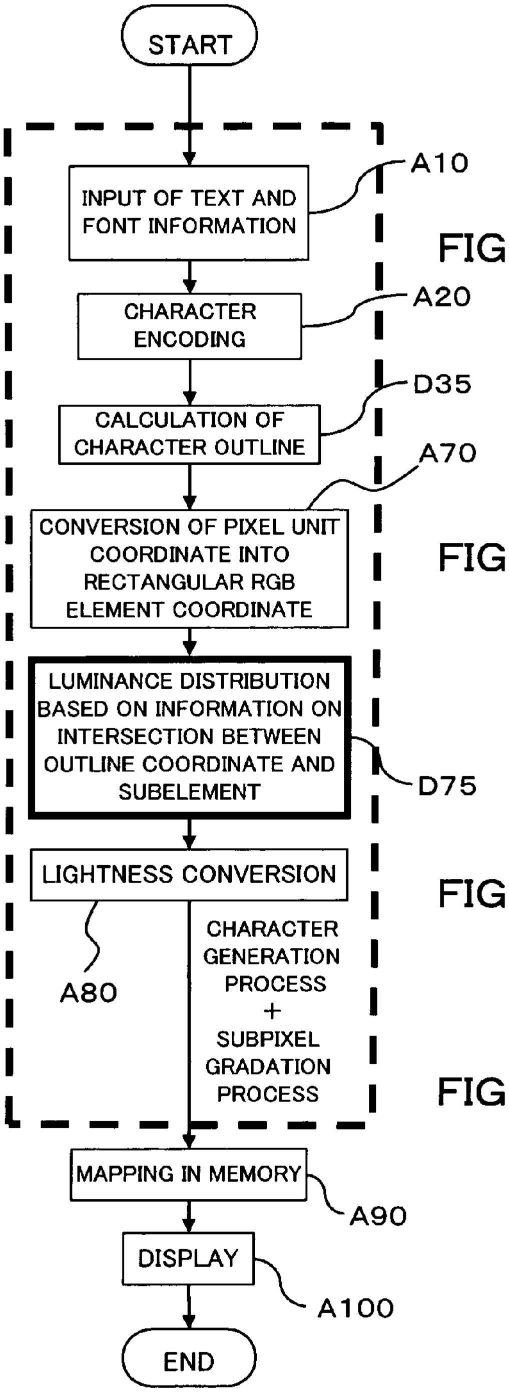
FIG. 11B EXAMPLE OF CHARACTER IMAGE INPUT
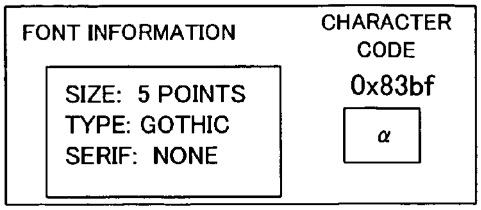
FIG. 11C
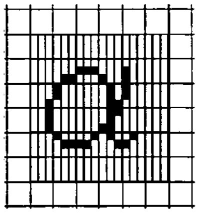
FIG. 11D
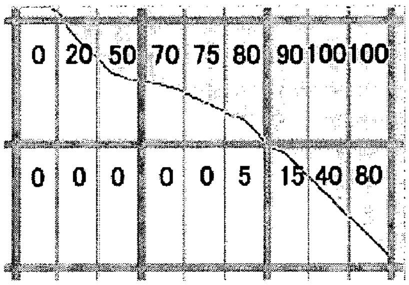
FIG. 11E
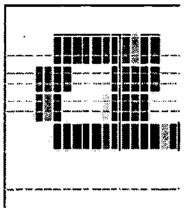
FIG. 11F
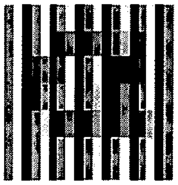

FIG. 14

| FONT | RASTERIZER |
| --- | --- |
| A | 15-1 |
| B | 15-1 |
| C | 15-2 |
| ⋮ | ⋮ |

16

FIG. 18

| LEFT SIDE VALUE | RIGHT SIDE VALUE | GRADATION VALUE |
|---|---|---|
| 0 | 0 | 32 |
| 0 | 1 | 64 |
| 0 | 2 | 96 |
| 0 | 3 | 128 |
| 1 | 0 | 64 |
| 1 | 1 | 96 |
| 1 | 2 | 128 |
| 1 | 3 | 159 |
| 2 | 0 | 96 |
| 2 | 1 | 128 |
| 2 | 2 | 159 |
| 2 | 3 | 191 |
| 3 | 0 | 128 |
| 3 | 1 | 159 |
| 3 | 2 | 191 |
| 3 | 3 | 224 |

NO OCCURRENCE OF DISTORTION

OCCURRENCE OF DISTORTION

DISPLAY APPARATUS, DISPLAY CONTROL APPARATUS, DISPLAY METHOD, AND COMPUTER-READABLE RECORDING MEDIUM RECORDING DISPLAY CONTROL PROGRAM

This application is a continuation of international application PCT/JP2004/000696 filed on Jan. 27, 2004.

TECHNICAL FIELD

The present invention relates to a display apparatus, for example, a color liquid crystal display device or the like, designed to make a display corresponding to one pixel commonly through the use of R (red), G (green) and B (blue) rectangular display elements, and more particularly to a display apparatus, display control apparatus, display method, and computer-readable recording medium recording display control program, suitable for use in display of characters with high definition.

BACKGROUND ART

In recent years, a flat panel type display apparatus (personal computer), represented by a liquid crystal color display device, has mainly been placed into portable utilization along with weight reduction thereof. Under such a situation, there exists a requirement for high-definition display of characters and color image display using a smaller screen.

For the purpose of achieving character display with high visibility in the case of the display of highly fine characters, Japanese Patent Laid-Open No. 2002-91369 (patent document 1) discloses a method in which, for example, in a color liquid crystal display device designed to make display of one pixel through the use of R (red), G (green) and B (blue) rectangular display elements, a character image which is an object of display is displayed in a state where each of the rectangular display elements is associated with one or more pixels.

The method disclosed in this patent document 1 first acquires a two-valued character image (binary character image) with triple size on the basis of font data in a character formation process using a rasterizer. This triple-size binary character image is mapped in a coordinate system associated with each rectangular display element and each pixel is then gradated through smoothing on this coordinate system so as to reduce the jaggy (notched portion) at character edge portions and a character image is displayed on each rectangular display element in a state associated with three pixels.

In general, in a case in which character display is made in a portable electronic device such as a portable telephone or PDA (Personal Digital Assistants), it is said that a character size of approximately 3 mm is optimum. Moreover, now, in a highest-definition liquid crystal display (liquid crystal panel) generally put on the market, the screen resolution is approximately 180 dpi (dot per inch). In a case in which character display is made on a liquid crystal panel having a screen resolution of approximately 180 dpi through the use of the method of tripling a character image size, which is disclosed in the above-mentioned patent document 1, the resolution level becomes approximately 500 dpi, which is equivalent to the display of a character image of approximately 3 mm with a resolution of approximately 60 dots×60 dots.

However, in the case of the above-mentioned conventional method, distortion can occur in a character image due to quantization error when a binary character image is mapped in each rectangular display element.

In general, a font (printing font) developed for printing is created using a mesh exceeding 1000 to 10000 dpi. In addition, for example, for expressing a character image with a size of 3 mm accurately through the use of such a printing font, there is a need to use a dot of approximately 120 to 1200 dpi per character. However, in the case of the liquid crystal display commonly put on the market as mentioned above, the resolution is lacking in accurate regeneration of the printing font, which causes a dislocation of stroke connection position and a distortion in a direction of the stroke width to occur when a character image is displayed through the use of the aforesaid conventional method, which can degrade the character quality.

For example, in the case of displaying complicated characters such as Japanese characters, the character stroke width (line width) and the spacing between lines constituting a character can become approximately one dot. Moreover, for the formation of a binary character image, depending upon the accuracy of the character formation process, the stroke position can be dislocated in units of one dot. If such a stroke position dislocation occurs, a distortion occurs particularly at a connection position between lines constituting a character, which introduces a possible striking degradation of the character quality.

FIGS. 19A and 19B are illustrations for explaining a distortion of a character in a conventional character image displaying method. FIG. 19A is an illustration of an example of a character image having no distortion and FIG. 19B is an illustration of an example of a character image having a distortion. As shown in FIG. 19B, there is a case in which a distortion occurs at a position of connection between lines constituting the character.

In addition, when the character stroke width (line width) is approximately one dot, depending upon the accuracy of the binary character image formation process, the stroke width sometimes becomes 2 dots in some stroke directions. When the binary character image is projected onto a rectangular coordinate system for mapping it into a rectangular display element, a distortion can occur in the stroke width thereof in some stroke directions (see widths A and B in FIG. 19B).

FIGS. 20A and 20B are illustrations for explaining a distortion of a character in the case of the conventional character image displaying method. FIG. 20A is an illustration of an example of a character image in which no distortion occurs in a rectangular coordinate system before the projection, and FIG. 20B is an illustration of an example of a character image in which a distortion occurs when the character shown in FIG. 20A is projected onto a rectangular coordinate system, with it being shown at a resolution lower than the actual one for easy observation of a distortion generated state. The distortion occurs at the connection positions as shown in FIG. 20B (for example, right-hand oblique lines of a Japanese character signifying a “wood”, and other portions).

In general, an outline font (printing font) is made up of data describing a contour of a character and, on the basis of the information on this contour, a character outline is formed according to a character size needed and the pixels in the outline are filled with the black values (0), thereby producing a character image (glyph).

Although a degradation of a character image quality does not occur if the character outline information can be produced at a resolution equal in level to that at the design of the font describing the character outline, when the resolution at the production is low, the designed coordinate value does not always agree with the produced coordinate value depending upon the outline regeneration accuracy, which causes a distortion mentioned above to occur in a stroke.

The present invention has been developed in consideration of these problems, and it is an object of the invention to provide a display apparatus, display control apparatus, display method, display control program and computer-readable recording medium recording the same program, capable of reducing the quantization error for displaying a character with high visibility in the case of displaying a high-definition character.

[Patent Document 1] Japanese Patent Laid-Open No. 2002-91369

DISCLOSURE OF THE INVENTION

For achieving the above-mentioned purpose, a display apparatus according to the present invention is characterized by comprising a display unit formed by continuously and repeatedly arranging N (N signifies a natural number equal to or more than 2) rectangular display elements, capable of displaying colors different from each other, in a predetermined order in a predetermined arrangement direction in a state where a longitudinal direction of the rectangular display elements intersects perpendicularly with the arrangement direction and formed to be capable of displaying a color image in a state where the N display elements arranged in the predetermined order in the arrangement direction are associated with one pixel constituting an image which is an object of display, a multi-gradation character generating unit for generating information on a multi-gradation character image, obtained by gradating a character edge portion, on the basis of character information on the display object character, and an element display control unit for controlling each of the rectangular display elements constituting the display unit to control a display state in the display unit, with the element display control unit displaying the multi-gradation character image on the basis of the information on the multi-gradation character image in a state where each of the rectangular display elements is associated with one or more pixels.

In this connection, it is also appropriate that the multi-gradation character generating unit generates enlarged character image information on an enlarged character image for display of the same character with a size in the longitudinal direction, which is M (M signifies a natural number) times a character size of the display object character, and with a size in the arrangement direction, which is N times that of the display object character by making a display corresponding to one pixel through the use of the N rectangular display elements, and an element luminance value calculating unit is provided to, on the basis of the enlarged character image information generated by the multi-gradation character generating unit, associate one of the rectangular display elements with each pixel train composed of M pixels existing continuously in the longitudinal direction in the enlarged character image, and calculate luminance value with respect to the one of the rectangular display elements on the basis of a pixel value given to each of the M pixels, and the element display control unit controls each of the rectangular display elements in accordance with the luminance value calculated by the element luminance value calculating unit to display the enlarged character image with the character size on the display unit.

In addition, it is also appropriate that, in the display unit, the N rectangular display elements arranged in the predetermined order in the arrangement direction form a square element having a substantial square configuration, and the multi-gradation character generating unit generates, as the enlarged character image information, image information on the same character with a size in the longitudinal direction, which is one time the character size of the display object character, and with a size in the arrangement direction, which is N times that of the display object character.

Still additionally, it is also appropriate that the element luminance value calculating unit calculates the luminance value with respect to the rectangular display element on the basis of overlap information on each of the rectangular display elements in a rectangular image coordinate system formed in a state associated with the rectangular display elements and the enlarged character image, or that the element luminance value calculating unit calculates the luminance value with respect to the rectangular display element on the basis of area information on the enlarged character image overlapped with the rectangular display element.

Yet additionally, it is also appropriate that the element luminance value calculating unit calculates the luminance value with respect to the rectangular display element on the basis of a re-approach distance between the center of each of the rectangular display elements and a contour of the enlarged character image overlapped with the rectangular display element, or that the element luminance value calculating unit calculates the luminance value with respect to the rectangular display element on the basis of a re-approach distance between the center of gravity of each of the rectangular display elements and a contour of the enlarged character image overlapped with the rectangular display element.

Moreover, it is also appropriate that the element luminance value calculating unit calculates the luminance value with respect to the rectangular display element on the basis of the number of times of intersection of a contour of the enlarged character image, overlapped with the rectangular display element, with a side of each of the rectangular display element in the longitudinal direction, or that the element luminance value calculating unit calculates the luminance value with respect to the rectangular display element on the basis of a position of intersection of a contour of the enlarged character image, overlapped with the rectangular display element, with a side of each of the rectangular display elements in the longitudinal direction.

Still moreover, it is also appropriate that a luminance value converting unit is provided to carry out conversion processing for converting the luminance value with respect to each of the rectangular display elements into a luminance value meeting a lightness characteristic of each of the rectangular display elements so that the N rectangular display elements provides the same lightness.

Yet moreover, it is also appropriate that a plurality of multi-gradation character generating units are provided as the multi-gradation character generating unit and a selection unit is provided to select an arbitrary multi-gradation character generating unit from the plurality of multi-gradation character generating units on the basis of font type information serving as the character information.

In addition, it is also acceptable that the element luminance value calculating unit carries out luminance distribution for each coordinate corresponding to a configuration of the display element on the basis of the calculated luminance value so as to employ, as the luminance value of the character image, a value obtained by applying a lightness balance of the display element to this distribution value.

Still additionally, it is preferably that a pixel resolution of the display unit is 120 ppi (pixels per inch) to 240 ppi.

Furthermore, a display control apparatus according to the present invention, which carries out control for displaying a character on a display unit formed by continuously and repeatedly arranging N (N signifies a natural number equal to or more than 2) rectangular display elements, capable of displaying colors different from each other, in a predetermined order in a predetermined arrangement direction in a state where a longitudinal direction of the rectangular display elements intersects perpendicularly with the arrangement direction and formed to be capable of displaying a color image in a state where the N display elements arranged in the predetermined order in the arrangement direction are associated with one pixel constituting an image which is an object of display, is characterized by comprising a multi-gradation character generating unit for generating information on a multi-gradation character image, obtained by gradating a character edge portion, on the basis of character information on the display object character, and an element display control unit for controlling each of the rectangular display elements constituting the display unit to control a display state in the display unit, with the element display control unit displaying the multi-gradation character image on the basis of the information on the multi-gradation character image in a state where each of the rectangular display elements is associated with one or more pixels.

In this connection, it is also appropriate that the multi-gradation character generating unit generates enlarged character image information on an enlarged character image for display of the same character with a size in the longitudinal direction, which is M (M signifies a natural number) times a character size of the display object character, and with a size in the arrangement direction, which is N times that of the display object character by making a display corresponding to one pixel through the use of the N rectangular display elements, and an element luminance value calculating unit is provided to, on the basis of the enlarged character image information generated by the multi-gradation character generating unit, associate one of the rectangular display elements with each pixel train composed of M pixels existing continuously in the longitudinal direction in the enlarged character image, and calculate a luminance value with respect to the one of the rectangular display elements on the basis of a pixel value given to each of the M pixels, and the element display control unit controls each of the rectangular display elements in accordance with the luminance value calculated by the element luminance value calculating unit to display the enlarged character image with the character size on the display unit.

Still furthermore, it is also appropriate that, in the display unit, the N rectangular display elements arranged in the predetermined order in the arrangement direction form a square element having a substantial square configuration, and the multi-gradation character generating unit generates, as the enlarged character image information, image information on the same character with a size in the longitudinal direction, which is one time the character size of the display object character, and with a size in the arrangement direction, which is N times that of the display object character.

Still furthermore, it is also appropriate that the element luminance value calculating unit calculates the luminance value with respect to the rectangular display element on the basis of overlap information on each of the rectangular display elements in a rectangular image coordinate system formed in a state associated with the rectangular display elements and the enlarged character image, or that the element luminance value calculating unit calculates the luminance value with respect to the rectangular display element on the basis of area information on the enlarged character image overlapped with the rectangular display element.

In addition, it is also appropriate that the element luminance value calculating unit calculates the luminance value with respect to the rectangular display element on the basis of a position of intersection of a contour of the enlarged character image, overlapped with the rectangular display element, with a side of each of the rectangular display elements in the longitudinal direction.

Still additionally, it is also appropriate that a luminance value converting unit is provided to carry out conversion processing for converting the luminance value with respect to each of the rectangular display elements into a luminance value meeting a lightness characteristic of each of the rectangular display elements so that the N rectangular display elements provides the same lightness.

Yet additionally, it is also appropriate that a plurality of multi-gradation character generating units are provided as the multi-gradation character generating unit and a selection unit is provided to select an arbitrary multi-gradation character generating unit from the plurality of multi-gradation character generating units on the basis of font type information serving as the character information.

Moreover, it is also acceptable that the element luminance value calculating unit carries out luminance distribution for each coordinate corresponding to a configuration of the display element so as to employ, as the luminance value of the character image, a value obtained by applying a lightness balance of the display element to this distribution value.

In this connection, it is preferably that a pixel resolution of the display unit is 120 ppi (pixels per inch) to 240 ppi.

Furthermore, a display method according to the present invention, which displays a character on a display unit formed by continuously and repeatedly arranging N (N signifies a natural number equal to or more than 2) rectangular display elements, capable of displaying colors different from each other, in a predetermined order in a predetermined arrangement direction in a state where a longitudinal direction of the rectangular display elements intersects perpendicularly with the arrangement direction and formed to be capable of displaying a color image in a state where the N display elements arranged in the predetermined order in the arrangement direction are associated with one pixel constituting an image which is an object of display, characterized by comprising a multi-gradation character generating step of generating information on a multi-gradation character image, obtained by gradating a character edge portion, on the basis of character information on the display object character, and an element display control step of controlling each of the rectangular display elements constituting the display unit to control a display state in the display unit, in the element display control step, the multi-gradation character image being displayed on the basis of the information on the multi-gradation character image in a state where each of the rectangular display elements is associated with one or more pixels.

In this connection, it is also appropriate that, in the multi-gradation character generating step, enlarged character image information on an enlarged character image is generated for display of the same character with a size in the longitudinal direction, which is M (M signifies a natural number) times a character size of the display object character, and with a size in the arrangement direction, which is N times that of the display object character by making a display corresponding to one pixel through the use of the N rectangular display elements, and an element luminance value calculating step is provided to, on the basis of the enlarged character image information generated by the multi-gradation character generating step, associate one of the rectangular display elements with each pixel train composed of M pixels existing continuously in the longitudinal direction in the enlarged character image, and calculate a luminance value with respect to the one of the rectangular display elements on the basis of a pixel value given to each of the M pixels, and in the element display control step, each of the rectangular display elements is controlled in accordance with the luminance value calculated in the element luminance value calculating step to display the enlarged character image with the character size on the display unit.

In addition, it is also appropriate that, in the display unit, the N rectangular display elements arranged in the predetermined order in the arrangement direction form a square element having a substantial square configuration, and in the multi-gradation character generating step, image information on the same character with a size in the longitudinal direction, which is one time the character size of the display object character, and with a size in the arrangement direction, which is N times that of the display object character is generated as the enlarged character image information.

Still additionally, it is also appropriate that, in the element luminance value calculating step, the luminance value with respect to the rectangular display element is calculated on the basis of overlap information on each of the rectangular display elements in a rectangular image coordinate system formed in a state associated with the rectangular display elements and the enlarged character image.

Yet additionally, it is also appropriate that, in the element luminance value calculating step, the luminance value with respect to the rectangular display element is calculated on the basis of area information on the enlarged character image overlapped with the rectangular display element, or that, in the element luminance value calculating step, the luminance value with respect to the rectangular display element is calculated on the basis of a position of intersection of a contour of the enlarged character image, overlapped with the rectangular display element, with a side of each of the rectangular display elements in the longitudinal direction.

Moreover, it is also appropriate that a luminance value converting step is provided to carry out conversion processing for converting the luminance value with respect to each of the rectangular display elements into a luminance value meeting a lightness characteristic of each of the rectangular display elements so that the N rectangular display elements provides the same lightness.

Still moreover, it is also appropriate that a plurality of multi-gradation character generating means are provided for realizing the multi-gradation character generating step, and a selection step is provided to select arbitrary multi-gradation character generating means from the plurality of multi-gradation character generating means on the basis of font type information serving as the character information.

In addition, it is also acceptable that, in the element luminance value calculating step, luminance distribution is carried out for each coordinate corresponding to a configuration of the display element so as to employ, as the luminance value of the character image, a value obtained by applying a lightness balance of the display element to this distribution value.

Preferably, a pixel resolution of the display unit is 120 ppi (pixels per inch) to 240 ppi.

In addition, a display control program according to the present invention, which controls display of a character on a display unit formed by continuously and repeatedly arranging N (N signifies a natural number equal to or more than 2) rectangular display elements, capable of displaying colors different from each other, in a predetermined order in a predetermined arrangement direction in a state where a longitudinal direction of the rectangular display elements intersects perpendicularly with the arrangement direction and formed to be capable of displaying a color image in a state where the N display elements arranged in the predetermined order in the arrangement direction are associated with one pixel constituting an image which is an object of display, characterized by making a computer function as a multi-gradation character generating unit for generating information on a multi-gradation character image, obtained by gradating a character edge portion, on the basis of character information on the display object character, and an element display control unit for controlling each of the rectangular display elements constituting the display unit to control a display state in the display unit, and further making the computer fulfill a function so that the element display control unit displays the multi-gradation character image on the basis of the information on the multi-gradation character image in a state where each of the rectangular display elements is associated with one or more pixels.

Still additionally, the above-described display control program is recorded in a computer-readable recording medium according to the present invention.

The present invention provides the following effects and advantages.

(1) Since the multi-gradation character generating unit gradates a character edge portion of a character image so that a luminance value for each of the display elements constituting the display unit is calculated on the basis of this multi-gradation character image and the element luminance value calculating unit performs the mapping in a rectangular element coordinate corresponding to each of the rectangular display elements of the display unit, the quantization error is reducible and, for example, the distortion of a character image put on a liquid crystal display such as a flat panel display is reducible so as to improve the display quality of a character image and, even in the case of the display of a highly minute character, it is possible to display a character having high visibility but having less distortion and others.

(2) It is possible to preserve the type face of a high-resolution outline font, and it is possible to reduce the degradation of the design quality of a character image, thus improving the display image quality (quality). That is, this can enhance the regeneration accuracy of the outline of an outline font, thereby lessening the jaggy (notched portions at end portions of a character) in a character image displayed on the display unit so as to improve the display quality of a character image.

(3) The multi-gradation character generating unit generates a multi-gradation character image with a size in a longitudinal direction, which is M (M signifies a natural number) times a character size of a character image which is an object of display, and with a size in an arrangement direction, which is N times that of the display object character image and the element luminance value calculating unit calculates a luminance value for one rectangular display element on the basis of a pixel value given to each of M pixels in a state where one rectangular display element is associated with each pixel train composed of the M pixels existing continuously in the longitudinal direction, included in the multi-gradation character image, and the display control unit controls each of the rectangular display elements in accordance with the luminance value calculated by the element luminance value calculating unit to display each character constituting a character image with a character size on the display unit, thus enabling the display to be made in a state associated with the M pixels with respect to one rectangular display element so that a finer character image can be displayed on the display unit.

(4) The element luminance value calculating unit calculates an average value of the pixel values given to the respective M pixels to calculate a luminance value for one rectangular display element on the basis of this average value. This enables easy calculation of a luminance value of the rectangular display element.

(5) The luminance value converting unit carries out the conversion processing for converting a luminance value for each display element into a luminance value meeting the lightness characteristic of each display element so that the same lightness is obtainable when the N display elements make the display according to the same luminance value, which makes lightness thereof regularly when the respective display elements have the same luminance values, so the lightness unevenness disappears in a character image displayed on the display unit 2, thus improving the quality of an image to be displayed.

(6) The existing rasterizer is also employable, which leads to the improvement of versatility.

(7) Since the luminance value for the rectangular display element is calculated on the basis of the overlap information on each of the rectangular display elements in a rectangular image coordinate system formed in a state associated with the rectangular display elements and the enlarged character image, the speed-up of processing is achievable.

(8) Since a plurality of multi-gradation character generating units are employable and a character image is producible through the use of, of the plurality of multi-gradation character generating units, a multi-gradation character generating unit handling the font, a high convenience is attainable.

BRIEF DESCRIPTION OF THE DRAWINGS

FIGS. 6A and 6B are illustrations of luminance values which provide the same lightness when R, G and B display elements emit light according to the same luminance value.

FIGS. 8A, 8B, 8C, 8D, 8E and 8F are illustrations for explaining processing by calculation means (display control unit) in the display apparatus according to the first embodiment of the present invention.

FIGS. 11A, 11B, 11C, 11D, 11E and 11F are illustrations for explaining processing by calculation means (display control unit) in a display apparatus according to a third embodiment of the present invention.

FIG. 14 is an illustration of an example of a correspondence table between a font and a rasterizer which are to be used in the display apparatus according to the fourth embodiment of the present invention.

FIGS. 17A, 17B and 18 are illustrations for other luminance distribution (weighting calculation) methods for use in the display apparatus according to the third embodiment of the present invention.

BEST MODE FOR CARRYING OUT THE INVENTION

Embodiments of the present invention will be described hereinbelow with reference to the Drawings.

(A) Description of the First Embodiment

Figure 1:
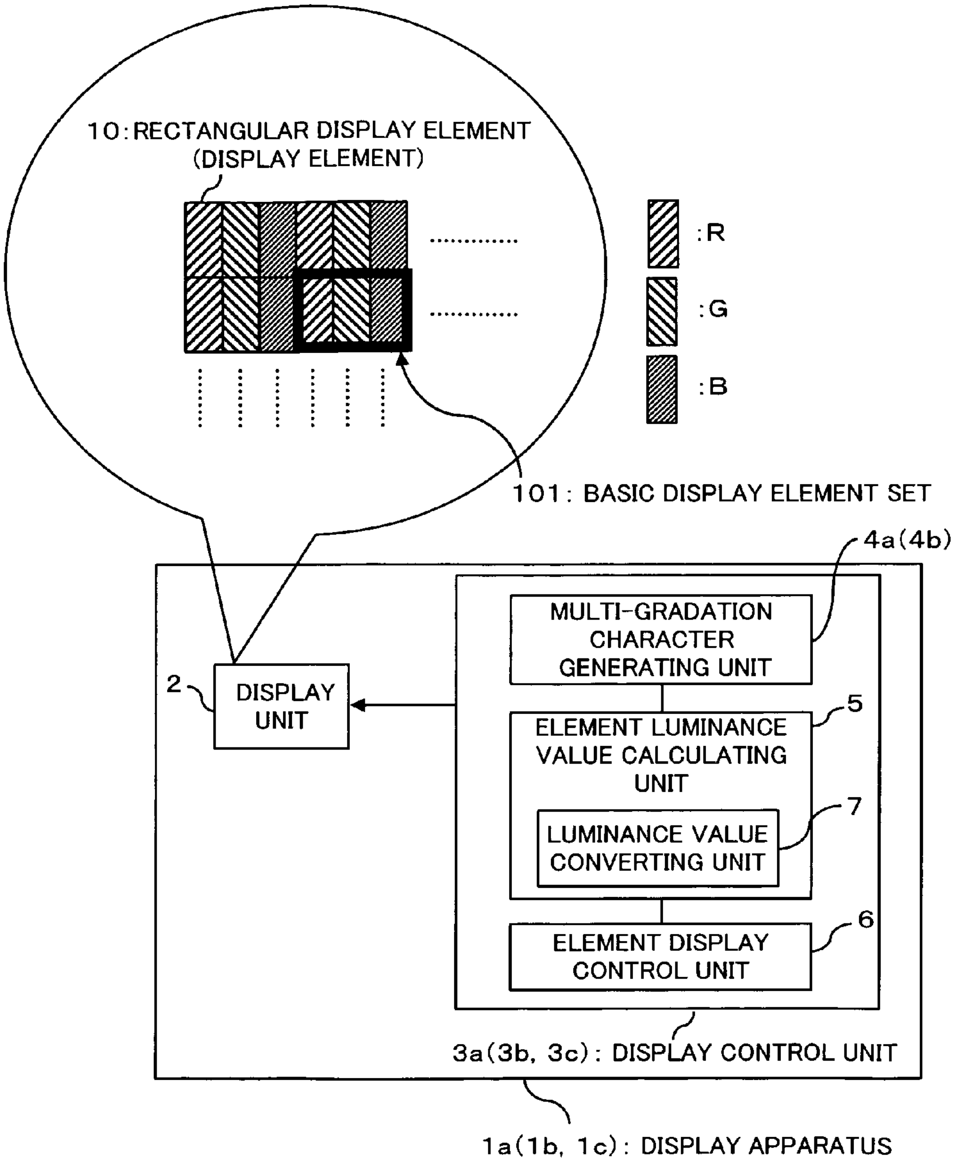
FIGS. 1 and 2 are illustrations of a display apparatus according to a first embodiment of the present invention.
Figure 2:
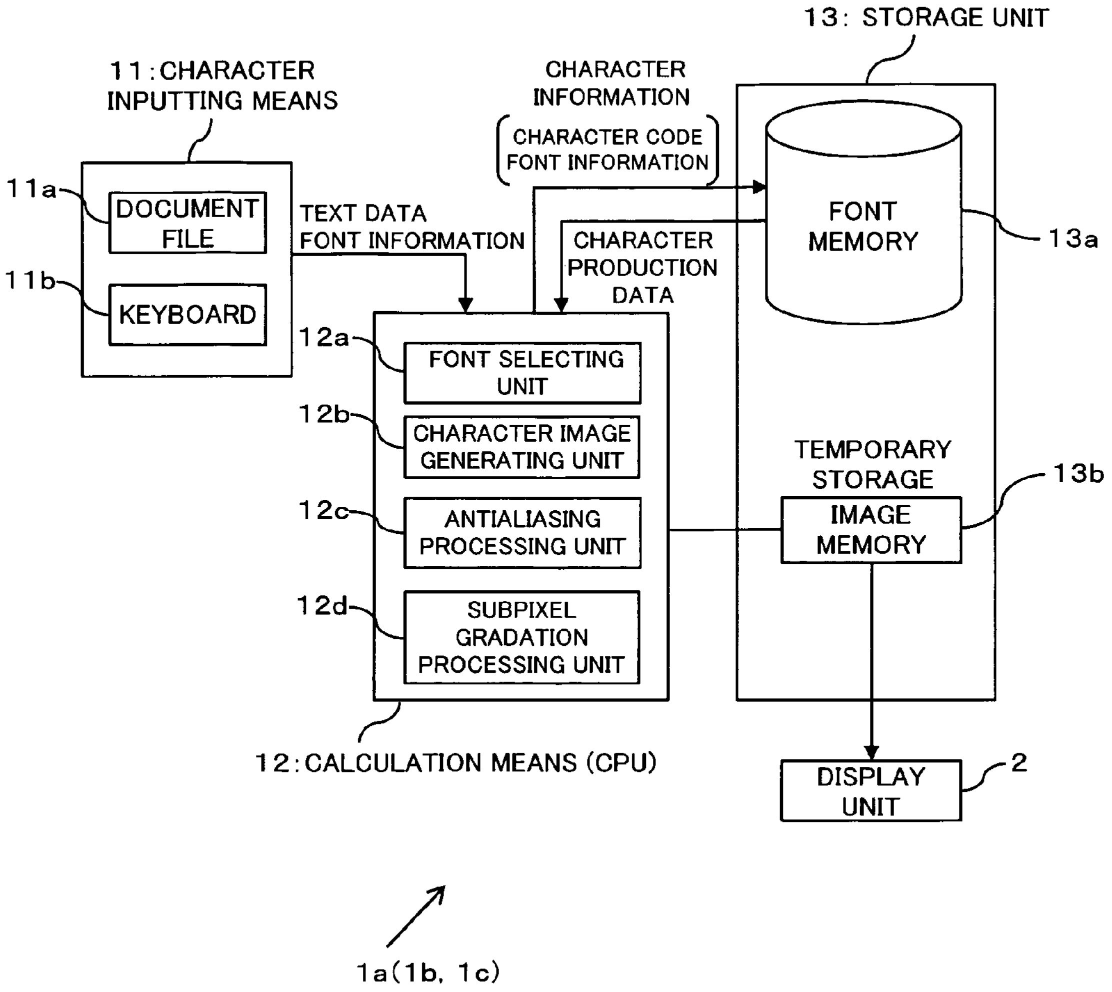

FIGS. 1 and 2 illustrate a display apparatus according to a first embodiment of the present invention. FIG. 1 is a block diagram showing a functional configuration thereof, and FIG. 2 is a block diagram showing a hardware configuration of the display apparatus according to this first embodiment.

A display apparatus 1*a* according to this first embodiment is provided in, for example, an information processing apparatus such as a computer and is equipped with a display unit 2 and a display control unit 3*a* as shown in FIG. 1.

The display unit 2 is for displaying a character image or the like which is an object of display and it is realized with, for example, a color liquid crystal display. As shown in FIG. 1, this display unit 2 has a plurality of sets of N kinds (in this embodiment, three kinds of R (red), G (Green) and B (Blue), that is, N=3)) of rectangular display elements 10 and is originally made so as to indicate one pixel through the use of these N kinds (in this embodiment, three colors of R, G and B) of rectangular display elements 10 and is capable of effecting color image display.

As FIG. 1 shows, in the display unit 2, the rectangular display elements 10 are regularly and continuously arranged in the order of R, G, B, R, G, B . . . in a predetermined arrangement direction (horizontal direction in FIG. 1; hereinafter referred to as an arrangement direction) in a state where a longitudinal direction (vertical direction in FIG. 1; hereinafter referred to as a longitudinal direction) of each of the rectangular display elements 10 intersects perpendicularly with the arrangement direction.

In the following description, the R, G and B rectangular display elements 10 adjacent to each other, which are three in number, i.e., an assembly of N rectangular display elements 10 which effect a one-pixel display in cooperation with each other will be referred to as a basic display element set 101. Moreover, the rectangular display element 10 will sometimes be referred to hereinafter as a display element 10.

In addition, in the display apparatus 1*a* according to this first embodiment, each of the display elements 10 is made such that the ratio of the dimensions in the longitudinal direction and in the arrangement direction becomes N:1 (in this embodiment, 3:1) and, when the R, G and B display elements, three in number, are arranged in the above-mentioned arrangement direction, these three display elements 10, i.e., the basic display element set 101, substantially have a square configuration.

Still additionally, in the display unit 2, the same kinds (colors) of rectangular display elements 10 are disposed continuously (in series) in the longitudinal directions of the rectangular display elements.

That is, the display unit 2 is made by disposing the basic display element sets 101 repeatedly and continuously in the vertical directions and in the horizontal directions and, in the display unit 2, the N kinds (in this embodiment, N=3) of rectangular display elements 10 are arranged repeatedly and continuously in a predetermined order (in the order of R, G and B in the example shown in FIG. 1) in the predetermined arrangement direction in a state where the longitudinal direction (for example, the vertical direction in FIG. 1) thereof intersects perpendicularly with the aforesaid arrangement direction (for example, horizontal direction in FIG. 1).

Incidentally, the present invention is not particularly limited with respect to the display mode and configuration of the display unit 2. For example, it is also possible to cover all changes of the arrangement order of the N kinds of display elements 10 constituting the display unit 2, the above-mentioned display mode and control method of the display unit 2 and others which do not constitute departures from the spirit and scope of the invention.

The display control unit 3*a* is for controlling the display of a character image on the above-mentioned display unit 2 and, as shown in FIG. 1, it includes a multi-gradation character generating unit 4*a*, an element luminance value calculating unit 5 and an element display control unit 6.

The multi-gradation character generating unit 4*a* is for generating information on a multi-gradation character image obtained by gradating a character edge portion on the basis of character information related to a character which is an object of display.

In this case, the character information signifies various types of information on a character and includes text data (character code) which is information for specifying the character contents and font information which is information for the formation of a character image (glyph) Incidentally, the font information includes a type of font (for example, Gothic type, mincho type, or other types), font modification data (for example, the presence or absence of bold type, long type and serif, size information), and others.

In addition, the multi-gradation character generating unit 4*a* is made to generate, as the font information, information on a multi-gradation character image (multi-valued character image) on the basis of an outline font formed by utilizing reproduction data (hereinafter referred to as outline data) on individual curves constituting a character outline.

The outline data is composed of curve data constituting a closed curve of a character image and, for example, in a case in which the Bezier curve expressed by the following equations is used as the curve data, the coordinate values of x1, x2, x3, x4, y1, y2, y3 and y4 are stored as the outline data in a font memory 13*a*.

$$x=(1-t)^3*x_1+3*(1-t)^2t*x_2+3(1-t)*t^2*x_3+t^3*x_4$$

$$y=(1-t)^3*y_1+3*(1-t)^2t*y_2+3(1-t)*t^2*y_3+t^3*y_4$$

(however, $0\leqq t\leqq 1$)

In this connection, a font formed through the use of outline data is referred to as an outline font and, in this specification, it is discriminated from a stroke font formed through the use of reproduction data on individual curves constituting a character center line.

Moreover, the multi-gradation character generating unit 4*a* can generate (output), as "information on a multi-gradation character image, a multi-gradation character image itself actually as a product, or it can also generate (output) only the information for specifying the multi-gradation character image. In this embodiment, the "generation of information on a multi-gradation character image" covers both the meanings thereof, and the following description will be given with respect to a case in which the multi-gradation character generating unit 4*a* actually generates the multi-gradation character image.

The multi-gradation character generating unit 4*a* is designed to form a character image (multi-gradation character image) by gradating an outline (edge) portion on the basis of the above-mentioned outline data. Concretely, the multi-gradation character generating unit 4*a* calculate a character contour on the basis of the outline data and then smears (rasterize) the interior of this outline to generate a character image, and further carries out the antialiasing processing for apparently smoothing notched portions of edge portions of curves constituting a character with respect to the generated character image, thus forming a multi-gradation character image (multi-gradation character image information).

The character image multi-gradation (antialiasing) method is realizable through the use of various existing methods, and an example thereof will be mentioned later.

The element luminance value calculating unit 5 calculates a brightness value for each of the display elements 10 for displaying the multi-gradation character image, generated by the multi-gradation character generating unit 4*a*, on the display unit 2, and it is made to map (carry out coordinate conversion) the pixels constituting the multi-gradation character image (pixel unit coordinate system), generated by the multi-gradation character generating unit 4*a*, in a rectangular pixel coordinate system (display element coordinate system) corresponding to a plurality of display elements 10 constituting the display unit 2 for calculating the luminance value for each of the display elements 10.

Concretely, the element luminance value calculating unit 5 associates one display element 10 with each pixel train composed of M pixels existing continuously in the longitudinal direction, included in the multi-gradation character image, and calculates a luminance value for one rectangular display element 10 on the basis of a pixel value given to each of the M pixels.

In this embodiment, the luminance value signifies a numeric value (for example, 0 to 255) denoting a brightness, and it is used for controlling the light emission (transmission) state of each of the display elements 10 and includes an indicated value for controlling these display elements 10.

The element display control unit 6 is for controlling each of the display elements 10 of the display unit 2 to control the display state in the display unit 2, and it is made to execute the control on the basis of the luminance values calculated by the element luminance value calculating unit 5 so that the multi-gradation character image is displayed on the display unit 2. For example, the element display control unit 6 controls the display state of a character image by controlling a drive voltage or the like in the display unit 2.

Furthermore, the display control unit 3*a* associates each display element 10 with one pixel or more (in this embodiment, three pixels) and makes a display corresponding to a plurality of pixels (in this embodiment, 9 pixels) through the use of continuing N (N kinds; in this embodiment, N=3) display elements 10 (basic display element set 101).

In the display apparatus 1*a* according to this first embodiment, the display control unit 3*a* associates each rectangular display element 10 with M (M=3 in this embodiment) pixels existing continuously in a direction (longitudinal direction) perpendicular to the above-mentioned arrangement direction and displays an M×N (3×3 in this first embodiment) matrix-like pixel group through the use of the N rectangular display elements 10 (basic display element set 101).

FIG. 2 shows a more concrete configuration of the display apparatus 1*a* according to this first embodiment. As shown in FIG. 2, the display apparatus 1*a* is composed of a character inputting means 11, a calculation means 12, a storage unit 13 and the display unit 2.

The character inputting means 11 is for inputting information (character information) for specifying a character to be displayed on the display unit 2 and, for example, it is composed of a document file 11*a*, a keyboard 11*b*, and others. This character inputting means 11 is realized with, in addition to various types of devices having an inputting function including a keyboard, mouse, floppy disk drive and others in a computer system, an API (Application Program Interface) in an application such as a contents viewer.

The storage unit 13 is composed of a font memory 13*a* and an image memory 13*b*. The font memory 13*a* is for storing information to be used for a multi-gradation character image and a character image, and it corresponds to various types of storages such as a hard disk and memory in a computer system.

In this embodiment, in the font memory 13*a*, outline data corresponding to various conditions (font information) including a font size (character image size; for example, 5 points or the like), a type of font (for example, mincho type, Gothic type, or other types), font modification data (for example, bold type, long type and others), the presence or absence of font modification, and others are stored as the font information (font data) for the formation of a multi-gradation character image.

The image memory 13*b* is made to temporarily store a luminance value for the display of a character image on the display unit 2, which is produced on the basis of a multi-gradation character image generated by the multi-gradation character generating unit 4*a* (character image generating unit 12*b*) and corresponds to a memory in a computer system.

The display unit 2 is made to display a character image mapped (stored) in the image memory 13*b* and is controlled by the calculation means 12.

The calculation means 12 is for carrying out various types of calculations and corresponds to a CPU (Central Processing Unit) in a computer system. Moreover, as shown in FIG. 2, the calculation means 12 is made up of a font selecting unit 12*a*, a character image generating unit 12*b*, an antialiasing processing unit 12*c* and a subpixel gradation processing unit 12*d*, and corresponds to the above-described display control unit 3*a*.

The font selecting unit 12*a* acquires, with respect to a character to be displayed on the display unit 2 according to an instruction from the character inputting means 11, character size information on the basis of the character information (text data, font information) thereon, and further acquires the outline data on this character from the font memory 13*a*.

The character image generating unit 12*b* is made to form an enlarged character image (hereinafter referred to as a multi-valued character image) for carrying out a display in a normal display mode having M-times size in the longitudinal direction and N-times size in the arrangement direction with respect to the inputted character size on the basis of the outline data acquired by the font selecting unit 12*a*. The following description of this embodiment will be given of a case in which M=N=3.

In this case, the normal display mode signifies a display mode in which a display of one pixel is made through the use of the N display elements 10 (basic display element set 101) in the display unit 2 and, in this display apparatus 1*a*, the character image information to be used for making the display corresponding to one pixel through the use of the R, G and B rectangular display elements 10, three in number, will sometimes be referred to as normal character image information.

The calculation means 12 acquires the outline data on a character image, which is an object of display, from the font memory 13*a* on the basis of the character information inputted from the character inputting means 11 and, on the basis of these outline data and character information, forms, with respect to a character to be displayed according to an instruction from the character inputting means 11, an enlarged character image (hereinafter referred to as a character image) for displaying, in the normal display mode, the same character with the M-times size in the longitudinal direction and with N-times size in the arrangement direction with respect to the character size in that character image.

In addition, in the display apparatus 1*a* according to this first embodiment, the character image generating unit 12*b* (calculation means 12) is made to produce, with respect to the inputted character size (for example, 5 points), an enlarged character image of the same character with a triple size (for example, N=M=3; for example, 5×3=15 points) in the longitudinal direction and in the arrangement direction on the basis of the outline data acquired by the font selecting unit 12*a*.

The antialiasing processing unit 12*c* carries out the antialiasing processing on the character image (binary), produced by the character image generating unit 12*b*, for the gradation, thereby creating a gradated character image (multi-gradation character image).

Figure 3:
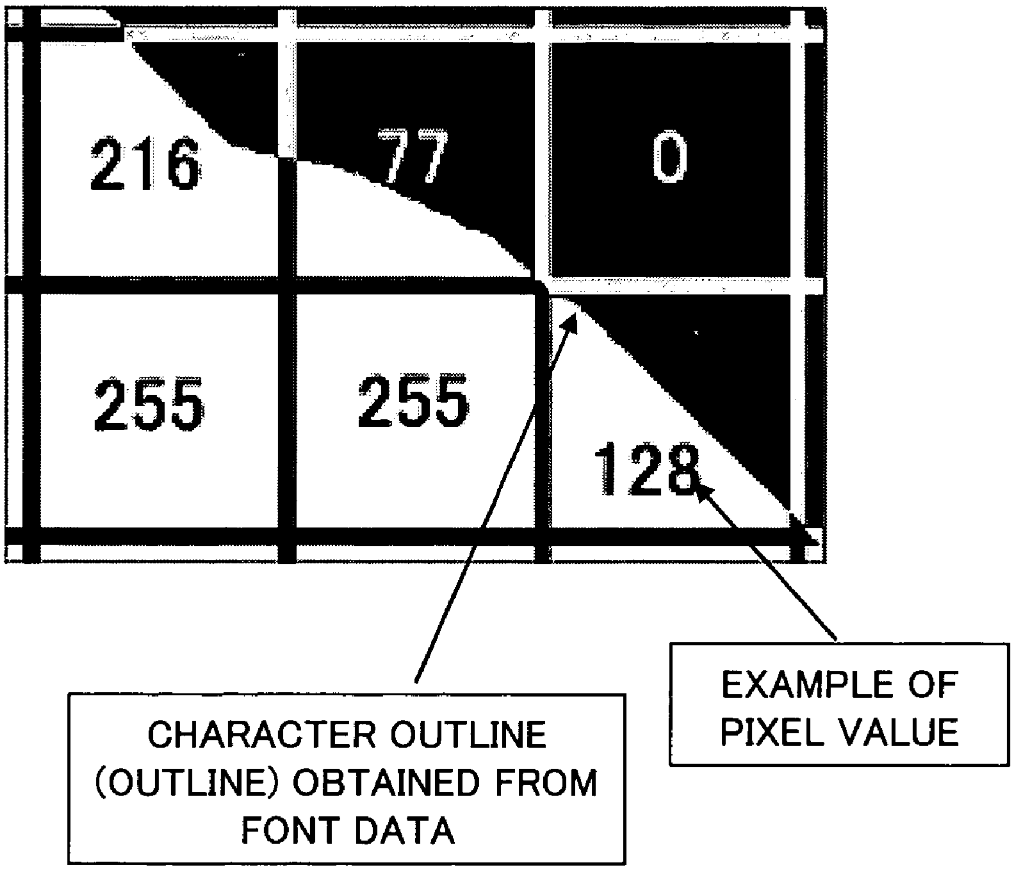
FIGS. 3 and 4 are illustrations for explaining a method of realizing the gradation of a character image in the display apparatus according to the first embodiment of the present invention.
Figure 4:
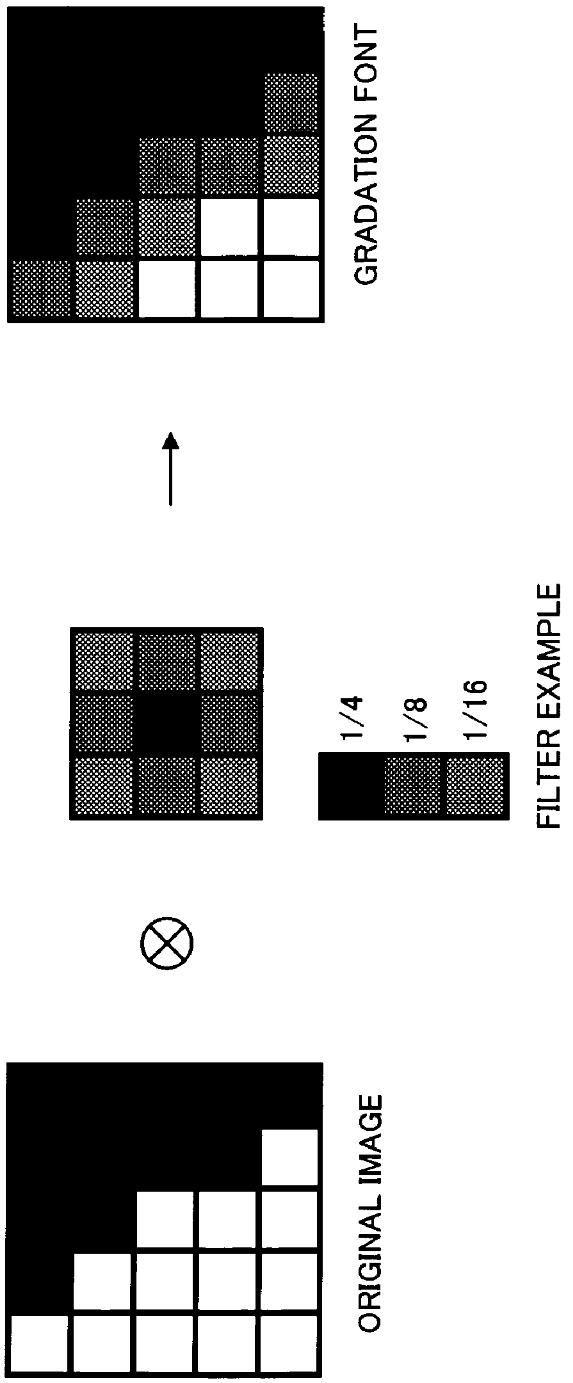

FIGS. 3 and 4 are illustrations for explaining a method of realizing the gradation of a character image in the display apparatus 1*a* according to the first embodiment of the present invention. FIG. 3 is an illustration for explaining an area gradation method. FIG. 4 is an illustration for explaining a multi-gradation character image (gray scale font) producing method using a smoothing filter, and shows a portion of a character image, an example of a smoothing filter to be used for the production of a gradation character image, and a portion of a multi-gradation character image.

As shown in FIG. 3, in the gradation using the area gradation method, a character image (character outline, outline) formed on the basis of the outline data is mapped so as to be lapped over a matrix with grids each having a predetermined size and provided in a state associated with a pixel and, a teach grid, a pixel value of a pixel corresponding to each grid is determined according to a rate of the character image (character outline) overlapping area. In the example shown in FIG. 3, the pixel values of the respective pixels are expressed with 256 tone levels, i.e., 0 to 255, and the pixel value of a pixel (overlapping rate 100%) overlapping fully with the character image is set at 0 (black), while the pixel value of a pixel (overlapping rate 0%) which does not overlap with the character image at all is set at 255 and, with respect to the pixels which overlap partially therewith, the pixel values thereof are set in proportion to the overlapping areas.

As shown in FIG. 4, in the gradation method using a smoothing filter, a multi-gradated character image (gradation font, gray scale font) can be formed by superimposing a smoothing filter (for example, $1/16$ $1/8$ $1/16$, $1/8$ $1/4$ $1/8$, $1/16$ $1/8$ $1/16$), composed of a 3×3 matrix, on a character image made with two gradations. Incidentally, the smoothing filter to be used is not limited to that shown in FIG. 4, but it is possible to employ various modifications thereof.

In addition, in the display apparatus 1*a* according to this first embodiment, the antialiasing processing unit 12*c* is made to carry out the multi-gradation on a character image through the use of, for example, the above-mentioned area gradation.

That is, in the display apparatus 1*a* according to this first embodiment, the aforesaid character image generating unit 12*b* and the antialiasing processing unit 12*c* are made to generate a multi-valued character image to be displayed on the display unit 2 and, with respect to a character to be displayed on the display unit 2 according to the instruction/inputting from the character inputting means 11, it is made to generate a multi-valued character image (character image which has undergone the antialiasing processing) on the basis of the outline data acquired from the font memory 13*a* by the font selecting unit 12*a*. Accordingly, in the display apparatus 1*a* according to this first embodiment, the character image generating unit 12*b* and the antialiasing processing unit 12*c* serve as a rasterizer having an antialiasing function.

The subpixel gradation processing unit 12*d* is for carrying out the processing to develop the multi-valued character image, produced by the character image generating unit 12*b* and the antialiasing processing unit 12*c*, into each of the rectangular display elements 10 constituting the display unit 2.

This subpixel gradation processing unit 12*d* is made to carry out the mapping conversion from the coordinate (pixel unit coordinate; see FIG. 5A) of each of the pixels constituting the multi-valued character image into the coordinate (rectangular element coordinate; see FIG. 5B) corresponding to each of the rectangular display elements 10 constituting the display unit 2.

In addition, the subpixel gradation processing unit 12*d* maps the mapping-converted multi-valued character image in, for example, the image memory (display memory) 13*b*, and associates one display element 10 with each pixel train composed of three pixels existing continuously in the longitudinal direction (direction perpendicular to the direction of the arrangement of the display elements 10), which are included in the multi-valued character image mapped in the image memory 13*b* so as to calculate the luminance value with respect to each display element (rectangular display element) 10 on the basis of a pixel value given to each of these three pixels so that a 3×3 matrix-like pixel group is displayed by the three display elements (basic display element set 101) adjacent to each other in the aforesaid arrangement direction, thus displaying the character image, which is an object of display, on the display unit 2.

Figure 5A:
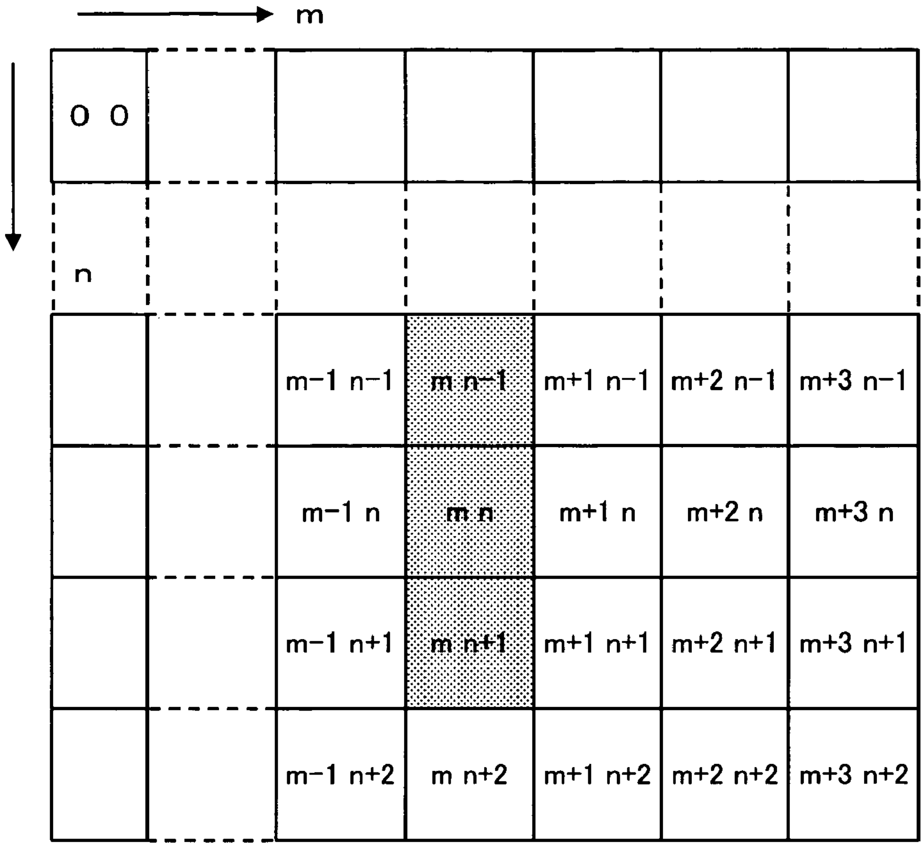
FIGS. 5A and 5B are illustrations for explaining a coordinate conversion method for use in the display apparatus according to the first embodiment of the present invention.
Figure 5B:
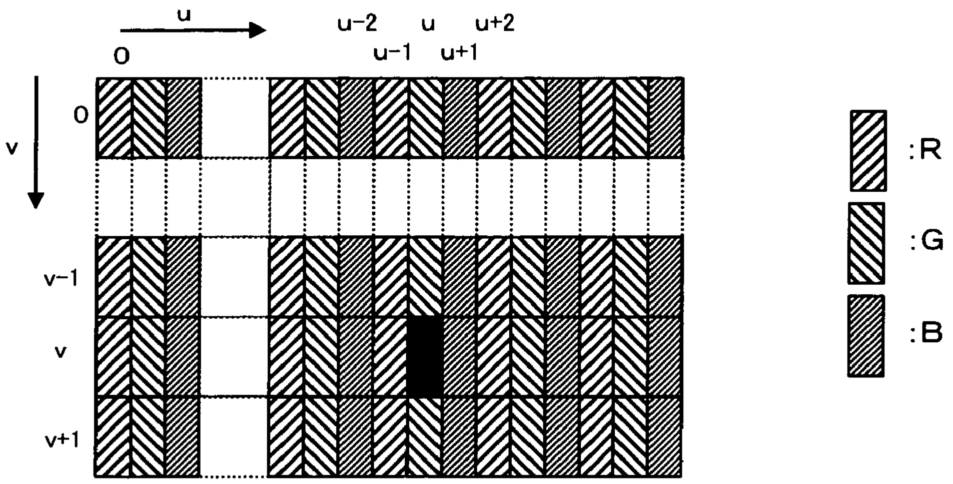

Referring to the drawing, a description will be given here of a control method whereby the subpixel gradation processing unit 12*d* displays a character image, which is an object of display, on the display unit 2. FIGS. 5A and 5B are illustrations for explaining a coordinate conversion method in the display apparatus according to the first embodiment of the present invention. FIG. 5A shows an example of the coordinate (pixel unit coordinate) of each pixel constituting a character image, and FIG. 5B illustrates an example of the display coordinate (rectangular element coordinate) of each display element 10.

With respect to the pixels constituting the multi-valued character image, for each pixel train comprising three pixels existing continuously in a direction perpendicular to the arrangement direction of the R, G and B display elements 10, i.e., in the longitudinal direction of the display elements 10, the subpixel gradation processing unit 12*d* first calculates the luminance value relative to each of the corresponding display elements 10 on the basis of these three pixel values adjacent to each other.

In this first embodiment, the subpixel gradation processing unit 12*d* calculates the luminance values of the display elements 10 on the basis of the pixel values for each pixel train comprising three pixels existing continuously in the aforesaid longitudinal direction, and carries out the coordinate conversion from a pixel unit coordinate system into a rectangular element coordinate system.

In this connection, in this first embodiment, as a method of calculating a luminance value for the display element 10, on the basis of pixel values for a pixel train comprising three pixels existing continuously, the subpixel gradation processing unit 12*d* averages the pixel values of these three pixels.

For example, in FIG. 5A, in the pixel unit coordinate, when the pixel value positioned at the coordinate (m, n−1) is expressed as Pmn−1, the pixel value of the pixel positioned at the coordinate (m, n) is denoted as Pmn and the pixel value of the pixel positioned at the coordinate (m, n+1) is expressed as Pmn+1, the average value P' of these three pixels is calculated by the following equation (1).

$$P'=(Pmn-1+Pmn+Pmn+1)/3 \quad (1)$$

With respect to the average value P' of the three pixels, in the case of expressing the average value of three pixels corresponding to the R (Red) display element 10, a symbol "R" is affixed to the symbol P' so that it is expressed as a symbol $P'_R$. Likewise, the average value of three pixels corresponding to the G (Green) display element is expressed as a symbol $P'_G$, and the average value of three pixels corresponding to the B (Blue) display element 10 is expressed as a symbol $P'_B$.

The subpixel gradation processing unit 12*d* associates the calculated three-pixels average pixel value (see FIG. 5A) with the display element 10 (see FIG. 5B), thereby converting the calculated three-pixels average value P' into the coordinate (rectangular element coordinate) of one display element 10.

In the following description, the conversion processing from the coordinates (pixel unit coordinates) in the coordinate system (pixel unit coordinate system), expressed by the coordinates (m, n) as shown in FIG. 5A, into the coordinates (rectangular element coordinates) in the coordinate system (rectangular element coordinate system) expressed by the coordinates (u, v) as shown in FIG. 5B, will sometimes be referred to as a coordinate conversion operation.

For example, in the examples shown in FIGS. 5A and 5B, the three pixels positioned at the coordinates (m, n−1), (m, n) and (m, n+1) are expressed through the use of the G display element 10 positioned at (u, v).

For example, the luminance value $Q_G$ of the G display element 10 positioned at the coordinate (u, v) in the rectangular element coordinate system is given by the following equation (2).

$$Q_G(u, v)=F_G(P'_G) \quad (2)$$

However, $$u=m$$

$$v=\mathrm{int}[(n+2)/3]$$

In this case, the equation int[a] denotes an integer portion of a numeric value a surrounded "["and "]". Moreover, F represents a function for the luminance conversion and, for example, it is expressed by a linear function, such as $F(x)=\alpha x+\beta$, where β designates an offset and α depicts an amplification factor.

Likewise, with respect to the R display element 10 and the B display element 10, the luminance values thereof are calculated through the use of the following equations (3) and (4).

$$Q_R(u, v)=F_R(P'_R) \quad (3)$$

$$Q_B(u, v)=F_B(P'_B) \quad (4)$$

Although the embodiment shown in FIGS. 5A and 5B takes an example in which the three pixels positioned at the coordinates (m, n−1), (m, n) and (m, n+1) are indicated through the use of the G display element 10 positioned at (u, v), the present invention is not limited to this.

For example, it is also possible not only that the three pixels positioned at the coordinates (m, n−2), (m, n−1) and (m, n) are indicated by the G display element 10 positioned at (u, v), but also that the three pixels positioned at the coordinates (m, n), (m, n+1) and (m, n+2) are indicated by the G display element 10 positioned at (u, v), and even these pixels are indicated by the R display element 10 positioned at (u−1, v) or by the B display element 10 positioned at (u+1, v). It is acceptable to make all modifications thereof herein which do not constitute departures from the spirit and scope of the invention.

Furthermore, in the display apparatus 1*a* according to this first embodiment, the subpixel gradation processing unit 12*d* (element luminance value calculating unit 5) has a function as a luminance value converting unit 7, and calculates luminance values ($Q_R$, $Q_G$, $Q_B$) and further carries out the conversion processing so that the lightness levels of the R, G and B display elements 10 become equal to each other with respect to these luminance values.

This luminance value converting unit 7 is made to carry out the conversion of the luminance values, mapped in the R, G and B display elements 10, into a gradation, in which the lightness is made regularly, according to the light emission of the display elements 10, and conducts the conversion processing from the luminance values for the display elements 10 into luminance values meeting the lightness characteristics of the display elements 10 so that the same lightness is achievable when the aforesaid three R, G and B display elements 10 stand at the same luminance values (in the same gradation).

Referring to the drawings, a description will be given here of the conversion processing by the luminance value converting unit 7.

The luminance value converting unit (subpixel gradation processing unit 12*d*) carries out the processing, expressed by the following equation, on the calculated luminance values on the basis of the calculation result of the luminance values ($Q_R$, $Q_G$, $Q_B$) to the display elements 10 so that the light emission of the display elements 10 show the same lightness when the R, G and B display elements 10 stand at the same luminance values.

In a case in which the luminance values calculated from the pixel values of a character image are $Q_R$, $Q_G$ and $Q_B$, respectively, if R', G' and B' are used as symbols for indicating that only the display positions are an R position, a G position and a B position of a liquid crystal display (display unit 2), respectively, equivalent to these $Q_R$, $Q_G$ and $Q_B$, the luminance values R' brightness, G' brightness and B' brightness converted into the lightness-regularized gradation (hereinafter referred to as lightness gradation) can be calculated by the following equations (5) to (7).

$$R' \text{ brightness}=Fb(0.60\ R') \quad (5)$$

$$G' \text{ brightness}=Fb(0.384\ G') \quad (6)$$

$$B' \text{ brightness}=Fb(1.0\ B') \quad (7)$$

In this case, Fb represents a function for the lightness-regularized gradation and, for example, it is expressed by a linear function such as $Fb(x)=\alpha' x+\beta'$, where β' denotes an offset value, and is set so that the lightnesses of the R, G and B display elements are made regularly. Moreover, α' is expressed by the following equation (8).

α'=(total number of tone levels of lightness gradation luminance−offset value)/total number of luminance indicated values (8)

Meanwhile, when the lightness value after converted is taken to be L, the Y stimulus value in the XYZ front color system is taken as Y, the 3 stimulus values of a standard light source for use in illumination or standard light is taken as Y0 and gradation values (stimulus values; for example, corresponding to 0 to 255 are taken as R', G, and B', the following relational expressions (9) to (14) are applicable.

$$L^*=116(Y/Y0)^{1/3}-16 \quad (9)$$

$$Y=aR+bG+cB \quad (10)$$

$$Y0=1.0 \quad (11)$$

$$R=(d(R'+e))^{2.4} \quad (12)$$

$$G=(d(G'+e))^{2.4} \quad (13)$$

$$B=(d(B'+e))^{2.4} \quad (14)$$

In this case, a to e designate constant values. Moreover, R, G and B denote color coordinates in an RGB front color system, where there is no unit, and they are converted into XYZ color regions through constant conversion. Still moreover, L* depicts a lightness and represents a luminance rate in the case of light emission. Still moreover, X, Y and Z are one of front color systems, where there is no unit.

Now, on the basis of sRGB (International Standard IEC61966-2-1), assuming that a:b:c=0.2126:0.7152:0.722,

R':G':B'=0.60:0.384:1.00 (15)

In a case in which the brightness is made regularly, with respect to the B range, the luminance values of G and R are equivalent to the use of 0.6 and 0.384, respectively.

In addition, when the luminance values are made regularly (R'=G'=B'), the following equation (16) is obtainable.

R' brightness:G' brightness:B' brightness=0.600:0.384:1.00 (16)

Incidentally, the aforesaid ratio of R' brightness; G' brightness:B' brightness tolerates an error of approximately 0.100. Therefore, the following is acceptable.

R' brightness:G' brightness:B' brightness=(0.600±0.100):(0.384±0.100):(1.00±0.100) (17)

That is, in the display apparatus 1*a* according to this embodiment, the luminance value converting unit 7 carries out the above-mentioned conversion processing on the above-mentioned luminance values to the three display elements 10, i.e., the R element, the G element and B element, so that the ratio of the luminance values after the conversion processing becomes=(0.600±0.100):(0.384±0.100):(1.00±0.100), thereby providing the same lightness when the R element, the G element and B element stand at the same luminance.

From the equations (9) and (11), in the XYZ front color system, only Y is a coordinate receiving an instruction on brightness. Moreover, if e is sufficiently small, a, b, c and R', G', B' become approximately equal to 1/2.4 times the inverse, thereby deriving the above-mentioned equation (15).

FIG. 6A is an illustration of luminance values (R' brightness, G' brightness, B' brightness) in a case in which the R, G and B display elements 10 emit light according to the same luminance value, and shows an example in which the total number of tone levels of luminance is set at 256 (0 to 255), while FIG. 6B is an illustration of a case in which (R, G, B)=(6, 4, 10) is set as offset values.

For example, an explanation will be given of FIG. 6A in a case in which each of the luminance values of the R, G and B display elements 10, calculated by the element luminance value calculating unit 5, becomes 100 so that the same luminance ((R', G', B')=(100, 100, 100)), for regularizing the lightness of the R, G and B display elements 10, the display control on the respective display elements 10 is implemented through the use of the luminance values converted as (R' brightness, G' brightness, B' brightness=(60, 38, 100).

Figure 7:
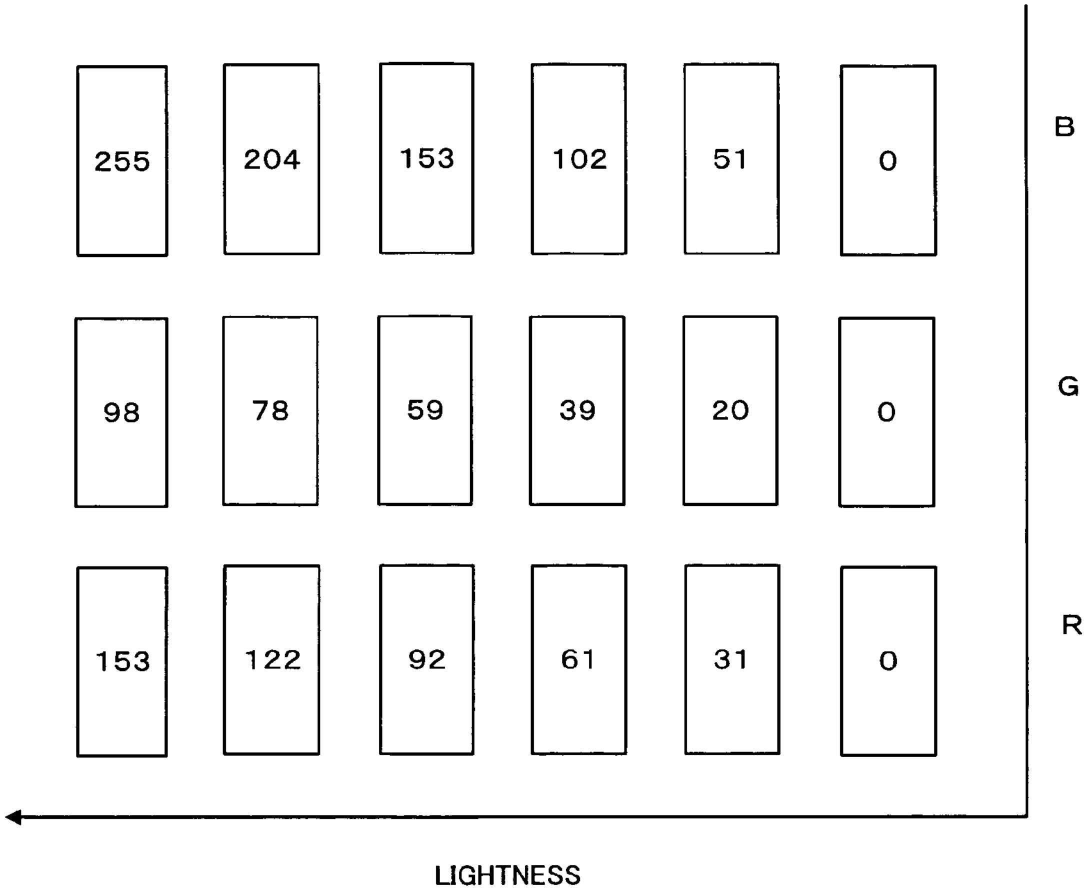
FIG. 7 is an illustration of an example of lightness-regularized gradation in the display apparatus according to the first embodiment of the present invention.

Moreover, FIG. 7 is an illustration of an example of lightness-regularized gradation in the display apparatus 1*a* according to the first embodiment of the present invention, and shows luminance at which the lightnesses agree with each other with respect to R, G and B colors in a case in which the lightness is set at 6 gradations with reference to the gradation value 0. In FIG. 7, at the luminance values standing in vertical directions, the lightnesses of the R, G and B colors coincide with each other. That is, the lightness of the R, G and B display elements 10 are proportional to the gradation steps and the lightness values of the R, G and B display elements 10 at the same gradation are made regularly.

As the lightness variation relative to the RGB luminance, the green (G) has the widest range while the blue (B) has a narrowest range. Accordingly, in the case of making a gradation with reference to the lightness, there is a need to adjust the two other color ranges to the variation of the blue having the smallest lightness variation range. In a case in which the number of gradation steps of the blue is set at 256 (0 to 255), the number of gradation steps of the green can be set up to a natural number which does not exceed (256×0.384/1.00).

In the above-described way, the subpixel gradation processing unit 12*d* (pixel luminance value calculating unit 5) calculates the luminance values to the respective display elements 10, and the calculation means 12 (display control unit 3*a*) controls the respective display elements 10 in accordance with the calculated luminance values.

The method of making a display on the display unit 2 by controlling the light emission states of the display elements 10 or the like in accordance with the luminance values (gradation values; for example, 0 to 255) obtained in corresponding relation to the display elements 10 is realizable with various types of existing methods, and the description thereof will be omitted.

The processing by the calculation means 12 (display control unit 3*a*) in the display apparatus according to the first embodiment of the present invention, thus configured, will be described with reference to a flow chart (steps A10 to A100) of FIG. 8A in view of FIGS. 8B, 8C, 8D, 8E and 8F.

When a character code for specifying a character which is an object of display is inputted through the character inputting means 11 (step A10), on the basis of the inputted character information (font information, character code) (see FIG. 8B), the font selecting unit 12*a* acquires, from the font memory 13*a*, the information (outline data) related to an outline font on a character which is the object of display (character encoding) (step A20).

Incidentally, the example shown in FIG. 8B shows that the font information comprising a font size: 5 points, a font type : Gothic and the presence or absence of serif; none and the information comprising a character code (0×83 bf) indicative of a character "α" are inputted as character information.

In addition, the font selecting unit 12*a* obtains a three-times size (for example, 15 points) in the longitudinal direction and in the arrangement direction with respect to a character size (for example, 5 points) of a character image which is an object of display (size conversion; step A30), and the character image generating unit 12*b* forms a character image of the same character with the calculated size (rasterizing; step A40, see FIG. 8C), and the antialiasing processing unit 12*c* gradates an edge portion of this character image (antialiasing; step A50) so as to generate a multi-gradation character image and map it in the image memory 13*b* (see FIG. 8D).

In the display apparatus 1*a* according to this first embodiment, the above-mentioned steps A10 to A50 will sometimes be referred to as a character generation process.

Following this, with respect to a multi-valued character image mapped in the image memory 13*b*, the subpixel gradation processing unit 12*d* (element luminance value calculating unit 5) averages (normalizes) the display luminances (luminance values) for each pixel train comprising three pixels existing continuously in the longitudinal direction of the display element 10 (step A60). Moreover, the subpixel gradation processing unit 12*d* makes a conversion on the pixel of the multi-gradation character image from the pixel unit coordinate to the rectangular element coordinate (step A70, see FIG. 8E).

In addition, on the basis of the luminance values calculated by the subpixel gradation processing unit 12*d* in the step A60, the luminance value converting unit 7 carries out the lightness gradation processing (lightness conversion) so that the same lightness is achievable in a case in which the R, G and B display elements 10 emit light at the same luminance value (step A80).

In the display apparatus 1*a* according to this first embodiment, the above-mentioned steps A60 to A80 will sometimes be referred to as a subpixel gradation process.

Still additionally, the subpixel gradation processing unit 12*d* maps the calculated (converted) luminance values in a multi-gradation memory (image memory 13*b*) (step A90, see FIG. 8F), and the calculation means 12 (display control unit 3*a*) controls the light emission states of the respective display elements 10 or the like in accordance with the luminance values (character image) mapped in the image memory 13*b* and displays each character constituting the character image on the display unit 2 (step A100).

Figure 9:
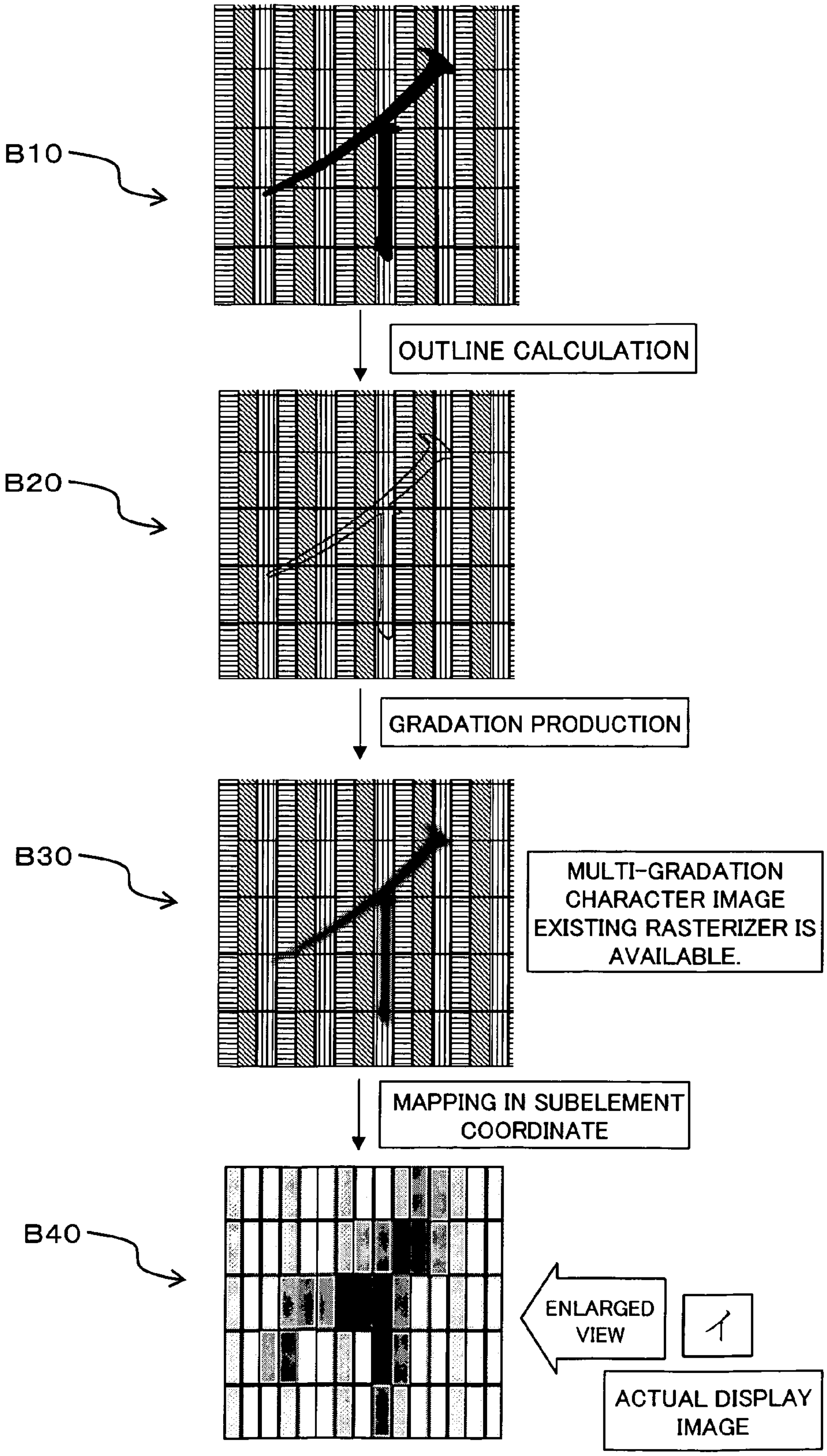
FIG. 9 is an illustration of a flow for explaining a character image display method for use in the display apparatus according to the first embodiment of the present invention.

FIG. 9 is an illustration of a flow (steps B10 to B40) for explaining a character image display method for use in the display apparatus 1*a* according to the first embodiment of the present invention, and shows an example in which one "Japanese katakana character" is displayed on the display unit 2. As shown in FIG. 9, in the display apparatus 1*a* according to this first embodiment, the information on a character image to be displayed is acquired (step B10), and the outline information (outline) thereon is acquired/calculated (step B20), thus forming a multi-gradation character image obtained by gradating a character edge portion (step B30).

On the basis of the formed multi-gradation character image (pixel unit coordinate), a mapping conversion (mapping) is made into a rectangular element coordinate corresponding to each rectangular display element 10 constituting the display unit 2 (step B40), thus displaying the character image image on the display unit 2.

As described above, in the display apparatus 1*a* according to the first embodiment of the present invention, a character edge portion of a character image is placed into a multi-gradation state by the multi-gradation character generating unit 4*a* (antialiasing processing unit 12*c*) so that the luminance value of each of the display elements 10 constituting the display unit 2 is calculated on the basis of this multi-gradation character image, and element luminance value calculating unit 5 (subpixel gradation processing unit 12*d*) carries out the mapping in the rectangular element coordinate corresponding to each display element (subpixel) 10 of the display unit 2, thereby reducing the quantization error and reducing the distortion of the character image to be displayed on, for example, a liquid crystal display such as a flat panel display, which can improve the character display quality and, even in the case of the display of a highly fine character, display a character with less distortion or the like and with high visibility.

Moreover, it is possible to preserve the type faces of a high-resolution outline font and lessen the degradation of the design quality of a character image, thus improving the display image quality (quality). That is, it is possible to increase the reproduction accuracy of the outline of the outline font and reduce the jaggy (notched portions at end portions of a character) in the character image to be displayed on the display unit 2, which can improve the character display image quality.

Still moreover, since the multi-gradation character generating unit 4*a* (character image generating unit 12*b*) calculates the gradation value of a pixel on the basis of an area partitioned by the character outline and each rectangular pixel, that is, places the character image into a multi-gradation state through the use of the area gradation method, thus enabling the accuracy of the character generation from the outline font to be preserved with a resolution of the display unit 2.

Yet moreover, since the display control unit 3*a* makes a display corresponding to 3×3 pixels through the use of three display elements 10 (basic display element set 101) in a state where each display element 10 is associated with three pixels, a display corresponding to a plurality of pixels can be made by the basic display element set 101, which can display a character image with higher definition on the display unit 2.

In addition, the multi-gradation character generating unit 4*a* (character image generating unit 12*b*) generates a multi-gradation character image with the triple size in the longitudinal direction and with the triple size in the arrangement direction with respect to the character size of a character image which is an object of display, and the element luminance valve calculating unit (subpixel gradation processing 12*d*) calculates a luminance value to one rectangular display element 10 on the basis of a pixel value given to each of three pixels in a state where the one rectangular display element 10 is associated with each pixel train comprising three pixels existing continuously in the longitudinal direction and included in the multi-gradation character image, and the display control unit 3*a* controls each rectangular display element 10 in accordance with the luminance values calculated by the element luminance value calculating unit 5 so as to display each character constituting the character image with a character size on the display unit 2, which enables the display to be made in a state where one rectangular display element 10 is associated with three pixels so that a character image with higher definition can also be displayed on the display unit 2.

Still additionally, the element luminance value calculating unit 5 calculates an average value of the pixel values given to three pixels to calculate a luminance value to one display rectangular display element 10 on the basis of this average value, thereby allowing a luminance value of the rectangular display element 10 to be calculated easily.

Yet additionally, the luminance value converting unit 7 carries the conversion processing to convert a luminance value to each display element 10 into a luminance value meeting the lightness characteristic of each display element 10 so that the same lightness is achievable in a case in which the three display element 10 make a display according to the same luminance value, which regularizes the lightness thereof when the respective display elements 10 stand at the same luminance value, thereby eliminating the lightness unevenness in a character image to be displayed on the display unit 2 so as to enhance the quality of an image to be displayed.

Moreover, since a 3×3 matrix-like pixel group is displayed in the basic display element set 101, a 3×3 square lattice is formed, thereby enabling an isotropy configuration in a finer area owing to the filter operation effects. Thus, there is no need to consider a lattice anisotropy, which can facilitate the filter design. Still moreover, the filter affected range can be made smaller than a conventional one. Concretely, the affected range, which is three times the major axis of a rectangular pixel at present, becomes three times the minor axis.

Yet moreover, the existing rasterizer is employable, which can improve the versatility.

(B) Description of the Second Embodiment

As well as the display apparatus 1*a* according to the first embodiment, for example, a display apparatus 1*b* according to a second embodiment of the present invention is provided in an information processing apparatus such as a computer and is equipped with a display unit 2 and a display control unit 3*b* as shown in FIG. 1.

The display control unit 3*b* is for executing a control to display a character image on the display unit 2 as well as the display control unit 3*a* according to the first embodiment, and it has a multi-gradation character generating unit 4*b* in place of the multi-gradation character generating unit 4*a* as shown in FIG. 1, and the other configuration is generally similar to that in the display control unit 3*a* according to the first embodiment. In the illustration, the same reference numerals as those used above designate the same or almost same parts, and the description thereof will be omitted.

Moreover, the display apparatus 1*b* according to this second embodiment has a hardware configuration similar to that display apparatus 1*a* shown in FIG. 2, and the description about the hardware configuration will be given with reference to FIG. 2.

The multi-gradation character generating unit 4*b* forms a character image (multi-gradation character image) by gradating a outline (edge) portion on the basis of the outline data as well as the multi-gradation character generating unit 4*a* according to the first embodiment, and after calculating a character outline on the basis of the outline data stored in the font memory 13*a* (see FIG. 2), carries out the processing to smear (rasterize) the interior of this outline for generating a character image, and further performs the antialiasing processing to apparently smooth the notched portions of edge portions of curves constituting the character with respect to the generated character image, thereby forming a multi-gradation character image (multi-gradation character image information).

Also in the display apparatus 1*b* according to this second embodiment, on the basis of the outline data acquired by the font selecting unit 12*a*, the character image generating unit 12*b* (see FIG. 2) is made to form an enlarged character image (hereinafter referred to as a multi-valued character image) to be displayed in a normal display mode so as to have an M-times size in the longitudinal direction and an N-time size in the arrangement direction with respect to the inputted character size. In this second embodiment, the character image generating unit 12*b* is made to form an enlarged character image (hereinafter referred to as a multi-valued character image) to be displayed in a normal display mode so as to have a one-time size in the longitudinal direction and a three-times size in the arrangement direction (that is, M=1, N=3).

Therefore, in the display apparatus 1*b* according to this second embodiment, the character image generating unit 12*b* is made to form an enlarged character image of the same character which has a three-times size (for example, 5×3=15 points) in only the arrangement direction with respect to the inputted character size (for example, 5 points) on the basis of the outline data acquired by the font selecting unit 12*a*.

That is, the calculation means 12 acquires the outline data on a character image, which is an object of display, from the font memory 13*a* on the basis of the character image inputted through the character inputting means 11, and with respect to a character to be displayed according to an instruction from the character inputting means 11, forms an enlarged character image (hereinafter referred to as a character image) on the basis of these outline data and character information for displaying, in a normal display mode, the same character with an one-time size in the longitudinal direction and with an N-times size in the arrangement direction with respect to the character size of the character image.

In addition, in the display apparatus 1*b* according to this second embodiment, the antialiasing processing unit 12*c* carries out the antialiasing processing on the character image produced by the character image generating unit 12*b* to create a multi-gradation character image in a gradating manner, and the subpixel gradation processing unit 12*d* conducts the processing to map the created multi-valued character image in the respective rectangular display elements 10 constituting the display unit 2.

In the display apparatus 1*b* according to this second embodiment, at the mapping conversion of a coordinate (pixel unit coordinate; see FIG. 5A) of each pixel constituting the multi-valued character image into a coordinate (rectangular element coordinate; see FIG. 5B) corresponding to each rectangular display element 10 constituting the display unit 2, the subpixel gradation processing unit 12*d* (element luminance value calculating unit 5) associates each of the individual pixels in the longitudinal direction (direction perpendicular to the arrangement direction of the display elements 10), included in the multi-valued character image mapped in the image memory 13*b*, with one display element 10.

Thus, the subpixel gradation processing unit 12*d* displays the character image, which is an object of display, on the display unit 2 in a state where one pixel is associated with one display element 10.

Figure 10A:
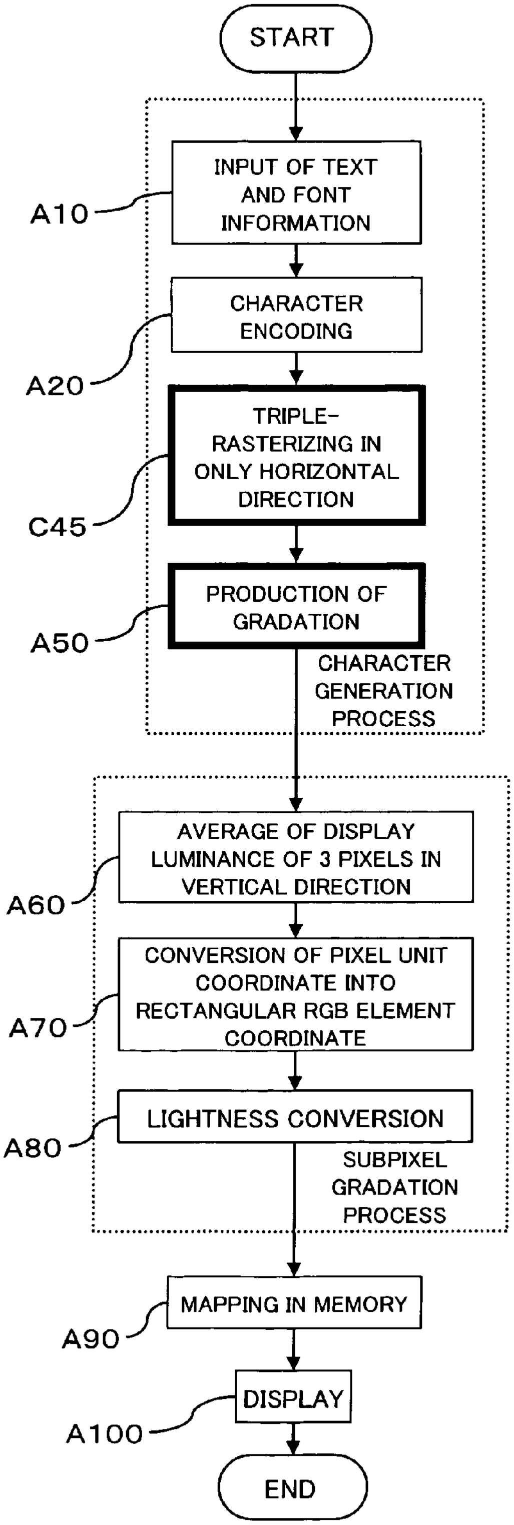
FIGS. 10A, 10B, 10C, 10D, 10E and 10F are illustrations for explaining processing by calculation means (display control unit) in a display apparatus according to a second embodiment of the present invention.

The processing to be conducted by the calculation means 12 (display control unit 3*b*) in the display apparatus 1*b* according to the second embodiment of the present invention will be described according to a flow chart (steps A10, A20, C45, A50 to A100) of FIG. 10A with reference to FIGS. 10B, 10C, 10D, 10E and 10F. In the illustration, the steps having the same reference numerals as those used above designate the same or almost same processing, and the detailed description thereof will be omitted.

Figure 10B:
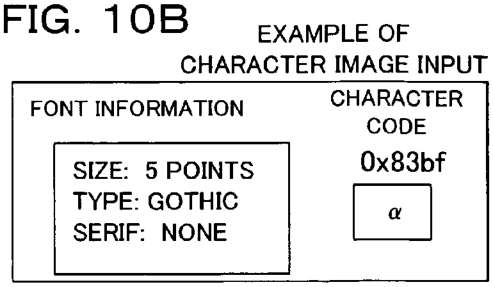

Moreover, the example shown in FIG. 10B also shows that the font information comprising a font size: 5 points, a font type : Gothic and the presence or absence of serif; none and the information comprising a character code (0×83 bf) indicative of a character "α" are inputted as character information.

Figure 10C:
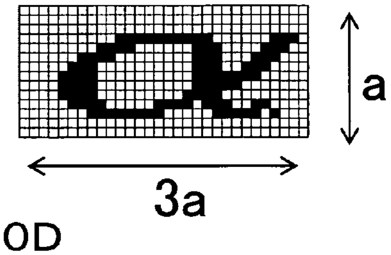

In the display apparatus 1*b* according to this second embodiment, the font selecting unit 12*a* obtains a three-times size (for example, 15 points) in only the arrangement direction with respect to a character size (for example, 5 points) of a character image, which is an object of display, and the character image generating unit 12*b* forms a character image of the same character with the calculated size (rasterizing; step C45, see FIG. 10C). For example, FIG. 10C shows an example in which the dimension in the longitudinal direction (vertical direction) is a and the dimension in the arrangement direction (horizontal direction) is 3*a*.

Figure 10D:
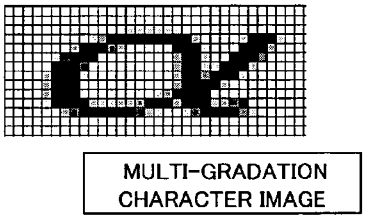
Figure 10E:
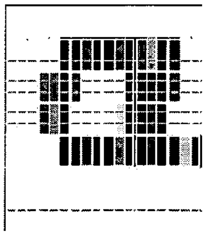
Figure 10F:
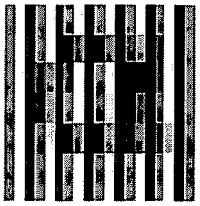

Moreover, the antialiasing processing unit 12*c* gradates an edge portion of this character image (antialiasing; step A50) to generate a multi-gradation character image and map it in the image memory 13*b* (see FIG. 10D).

In the display apparatus 1*b* according to this second embodiment, the above-mentioned steps A10, A20, C45 and A50 will sometimes be referred to as a character generation process.

Following this, as well as the display apparatus 1*a* according to the first embodiment, the subpixel gradation processing unit 12*d* carries out the subpixel gradation processing and the lightness conversion processing (steps A60 to A80, see FIG. 10E) so as to map the calculated (converted) luminance values in the multi-gradation memory (image memory 13*b*) (step A90, see FIG. 10F), and the calculation means 12 (display control unit 3) controls the light emission state of each of the display elements 10, or the like, in accordance with the luminance values (character image) mapped in the image memory 13*b*, thus displaying the respective characters constituting the character image on the display 2 (step A100).

As described above, the display apparatus 1*b* according to the second embodiment of the present invention can provide the effects/advantages similar to those of the display apparatus 1*a* according to the first embodiment and, additionally, since the display control unit 3*b* associates each of the display elements 10 with one pixel, there is no need for the subpixel gradation processing unit 12*d* to conduct the processing including the calculation (see the equation (1) in the first embodiment) of the luminance values of the display elements 10 based upon a plurality of pixels, and others, which can shorten the processing time to be taken for the display of a character image.

(C) Description of the Third Embodiment

As well as the display apparatus 1*a* according to the first embodiment, a display apparatus 1*c* according to a third embodiment of the present invention is also provided in, for example, an information processing apparatus such as a computer and is equipped with a display apparatus 2 and a display control unit 3*c* as shown in FIG. 1.

The display control unit 3*c* is for carrying out the control for displaying a character image on the display unit 2 as in the case of the display control unit 3*a* according to the first embodiment, and is designed to integrally fulfill the functions of the multi-gradation character generating unit 4*a*, the element luminance value calculating unit 5 and the luminance value converting unit 7 in the first embodiment, while the calculation means 12 is made to integrally carry out the functions of the character image generating unit 12*b*, the antialiasing processing unit 12*c* and the subpixel gradation processing unit 12*d*.

In addition, in the display apparatus 1*c* according to this third embodiment, the calculation means 12 calculates outline information (outline coordinates) on a character on the basis of outline data and maps the calculated outline coordinates directly in rectangular element coordinates (see FIG. 11D). In the display apparatus 1*c* according to this third embodiment, as shown in FIG. 11D, the rectangular element coordinates in which the outline coordinates are mapped are configured by arranging unit rectangles corresponding to the display elements continuously in a longitudinal direction and in a direction perpendicular to this longitudinal direction.

Still additionally, the calculation means 12 is made to perform luminance distribution (weighting calculation) on the basis of the information on a tolerance (overlap information) between a unit rectangle placed corresponding to the display element in a rectangular element coordinate system and a contour of a character.

In this embodiment, the same reference numerals as those used above designate the same or almost same parts, and the description thereof will be omitted. Moreover, since the display apparatus 1*b* according to this second embodiment has a hardware configuration similar to that of the display apparatus 1*a* shown in FIG. 2, a description will be given hereinbelow of the hardware configuration with reference to FIG. 2.

The processing by the calculation means 12 (display control unit 3*c*) in the display apparatus 1*c* according to the third embodiment of the present invention will be described according to a flow chart (steps A10, A20, D35, A70, D75, A80 to A100) of FIG. 11A with reference to FIGS. 11B, 11C, 11D, 11E and 11F. In the illustration, the steps with the same reference numerals as those used above designate the same or almost same processing, and the detailed description thereof will be omitted.

Moreover, the example shown in FIG. 11B also shows that the font information comprising a font size: 5 points, a font type : Gothic and the presence or absence of serif; none and the information comprising a character code (0x83bf) indicative of a character "α" are inputted as character information.

In the display apparatus 1*c* according to this third embodiment, when a character code for specifying a character which is an object of display is inputted through the character inputting means 11 (step A10), on the basis of the inputted character information (font information, character code) (see FIG. 11B), the font selecting unit 12*a* acquires, from the font memory 13*a*, the information (outline data) related to an outline font on a character which is the object of display (character encoding) (step A20), and the calculation means 12 obtains a three-times size (for example, 15 points) in each of the aforesaid longitudinal direction and arrangement direction with respect to a character size (for example, 5 points) of the character image which is the object of display and calculates an outline (character outline) of the same character with the calculated size (step D35, see FIG. 11C).

In addition, the calculation means 12 makes a conversion on the character outline information (outline coordinate) from the pixel unit coordinate to the rectangular element coordinate (step A70). That is, as shown in FIG. 11D, the calculation means 12 maps the calculated character outline in a rectangular element coordinate system corresponding to the display element 10 to carry out the luminance distribution (weighting calculation) on the basis of the tolerance information (overlap information) between a unit rectangle provided in corresponding relation to the display element 10 in the rectangular element coordinate system and the contour (step D75).

The example shown in FIG. 11D shows an example in which the character outline (character image) is mapped so as to be overlapped on the unit rectangles provided in a state associated with the pixels of the display elements 10 and shows a process in which a pixel value of the pixel corresponding to each grid is determined in accordance with the rate of the overlapping area of the character image (character outline) in each unit rectangle. In the example shown in FIG. 11D, the rate (overlap rate) of the area where the character image overlaps with each rectangular element is indicated in terms of percentage (0 to 100). For example, the unit rectangle (overlapping rate 100%) fully overlapping with the character image is denoted by 100 while the unit rectangle (overlapping rate 0%) which does not overlap with the character image at all is depicted by 0, and the unit rectangle which partially overlaps therewith is represented in terms of the corresponding percentage in proportion to the overlapping area.

Still additionally, the calculation means 12 calculates a luminance distribution to each display element 10 (unit rectangle) on the basis of these overlapping rates (overlap information).

Following this, the calculation means 12 carries out the lightness conversion (step A80, see FIG. 11E) and maps the calculated (converted) luminance value in the multi-gradation memory (image memory 13*b*) (step A90, see FIG. 11F), and the calculation means 12 (display control unit 3) controls the light emission state of each display element 10, or the like, in accordance with the luminance values (character image) mapped in the image memory 13*b* and displays each character constituting the character image on the display unit 2 (step A100).

Figure 12:
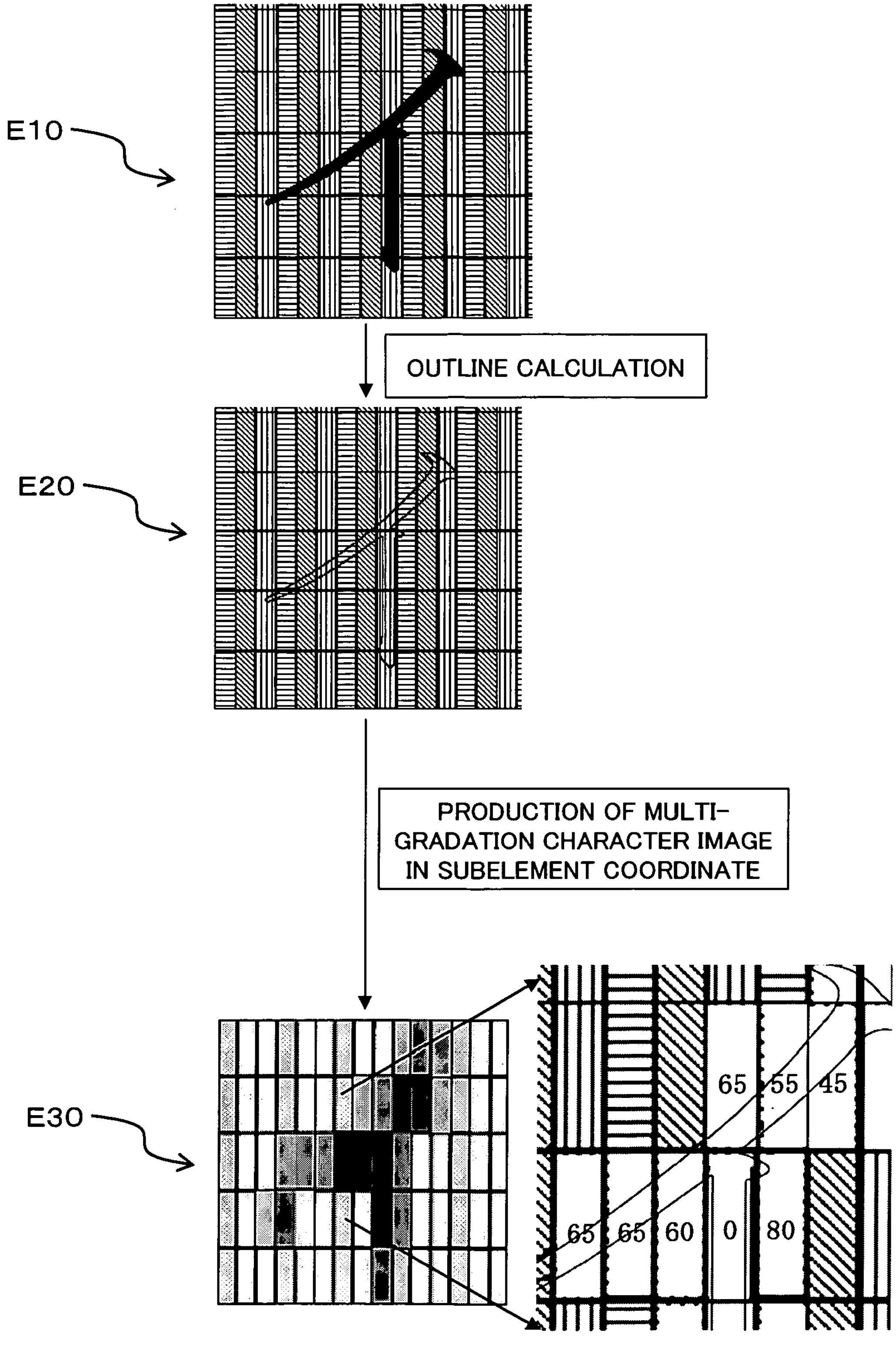
FIG. 12 is an illustration of a flow for explaining a character image display method for use in the display apparatus according to the third embodiment of the present invention.

FIG. 12 is an illustration (steps E10 to E30) of a flow for explaining a method of displaying a character image in the display apparatus 1*c* according to the third embodiment of the present invention, and shows an example in which one "Japanese katakana character" is displayed on the display unit 2. As shown in FIG. 12, in the display apparatus 1*c* according to this third embodiment, the information on a character image to be displayed is acquired (step E10), and the outline information (outline) on this character is acquired/calculated (step E20), and a multi-gradation character image is formed on rectangular element coordinates (step E30).

Concretely, the character outline is mapped in the rectangular element coordinate and the luminance distribution (weighting calculation) is made on the basis of the tolerance information (overlap information) between the unit rectangle provided in corresponding relation to the display element 10 in the rectangular element coordinate system and the contour of the character.

As described above, the display apparatus 1*c* according to the third embodiment of the present invention can provide the effects/advantages similar to those of the first embodiment, and additionally, since a character outline is mapped directly in a rectangular element coordinate, the speed-up of the processing is achievable.

That is, the luminance value to each display element 10 is calculated on the basis of the over lap information between each unit rectangle (rectangular display element) in the rectangular coordinate system (rectangular image coordinate system) formed in a state associated with the display element 10 and an enlarged character image, which enables the speed-up of the processing.

(D) Description of the Fourth Embodiment

Figure 13:
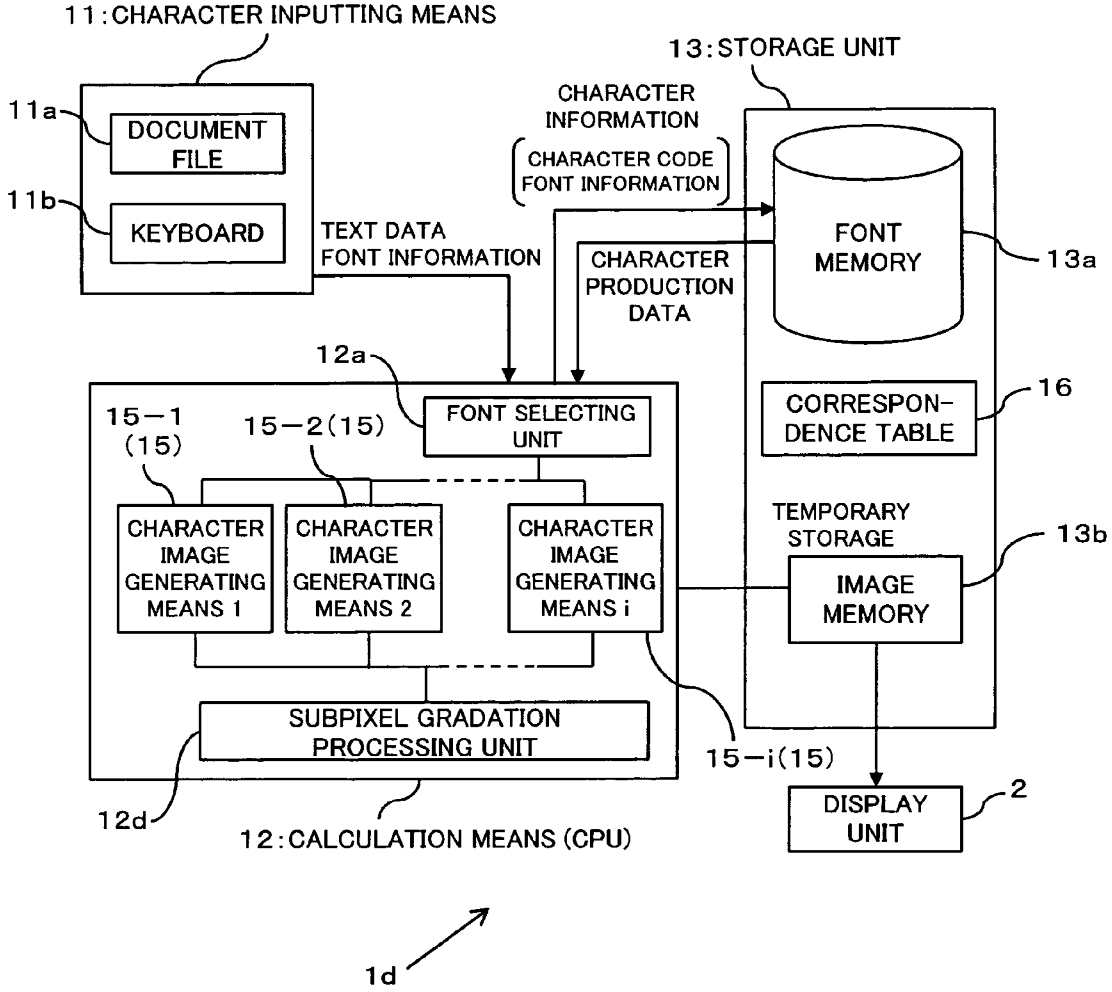
FIG. 13 is a block diagram showing a hardware configuration of a display apparatus according to a fourth embodiment of the present invention.

FIG. 13 is a block diagram showing a hardware configuration of a display apparatus 1*d* according to a fourth embodiment of the present invention.

In the display apparatus 1*d* according to this fourth embodiment, there are provided a plurality of rasterizers (character image producing means) 15 and a correspondence table 16 made in a manner such that character fonts are associated with the rasterizers which generate a character so that the rasterizer corresponding to a font is selected by referring to this correspondence table 16 and a character image (multi-gradation character image) is generated through the use of the selected rasterizer 15.

In the example shown in FIG. 13, i (i represents a natural number) rasterizers 15-1, 15-2 . . . , **15-*i* are provided, and in the following description, as the reference numerals for designating the rasterizers, 15-1 to 15-*i* are used when there is a need to specify one of the plurality of rasterizers, while reference numeral 15** is used when indicating an arbitrary rasterizer. Moreover, in the illustrations, the same reference numerals as those used above denote the same or almost same parts, and the description thereof will be omitted.

Furthermore, the rasterizer (character image generating means) 15 also has functions as the character image generating unit **12*b* and the antialiasing processing unit 12*c*** in the above-described respective embodiments.

FIG. 14 is an illustration of an example of the correspondence table with fonts and rasterizers to be used in the display apparatus **1*d* according to the fourth embodiment of the present invention, and this correspondence table 16 is made in a manner such that the character fonts and the rasterizers for generating a character are associated with each other. Moreover, with respect to a character to be displayed on the display unit 2 according to an instruction from the character inputting means 11, for example, the font selecting unit (selection unit) 12*a* acquires the character size information and the outline data on that character from the font memory 13*a* on the basis of the character information (text data, font information) thereon and selects the rasterizer 15 corresponding to that font by referring to the correspondence table 16**.

In this connection, although in this fourth embodiment the font selecting unit **12*a*** functions as a selecting unit to select an arbitrary character producing means from a plurality of character producing means for selecting the rasterizer corresponding to the font, the present invention is not limited to this, but it is also possible that the function as the selection unit is provided separately.

The display apparatus **1*d*** according to the fourth embodiment of the present invention can provide the effects/advantages similar to those of the above-described respective embodiments, and additionally, since a plurality of rasterizers are used and a character image can be generated through the use of, of these plurality of rasterizers, the rasterizer corresponding to the font, high convenience is attainable.

(E) Others

Figure 15:
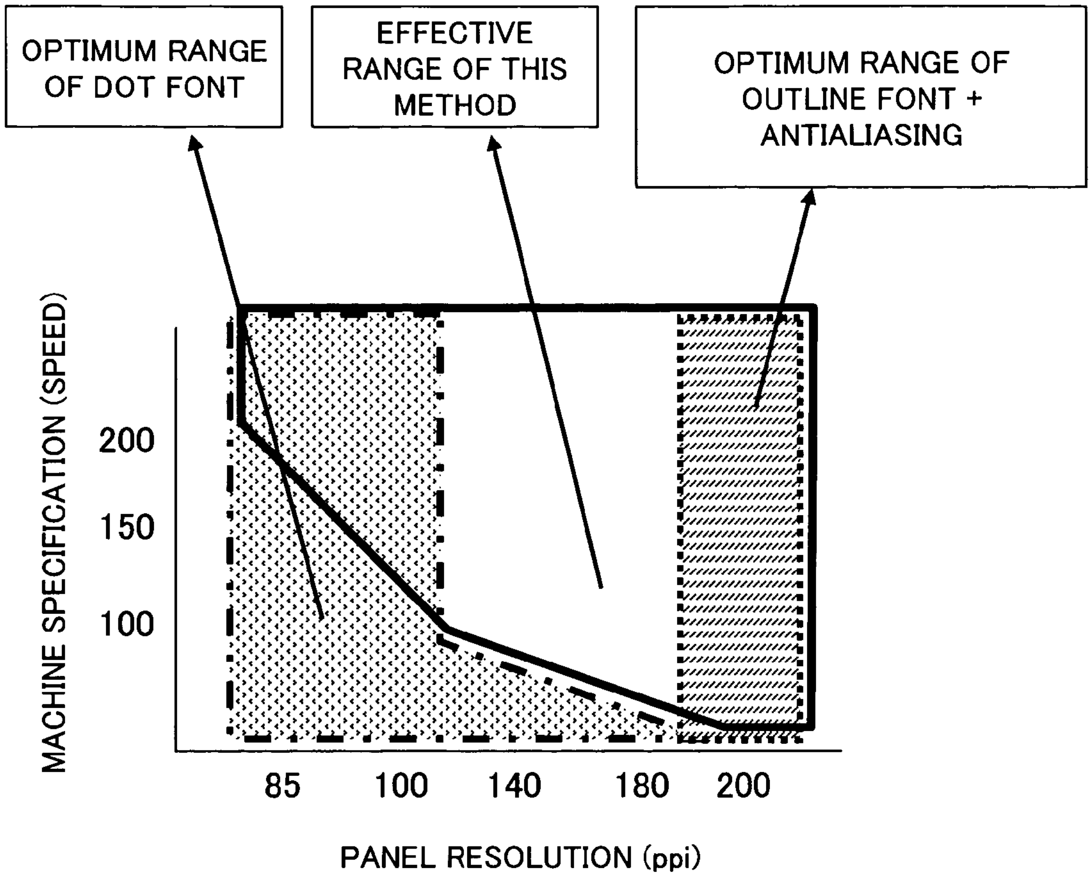
FIG. 15 is an illustration of an example of an application range of the display apparatus according to the respective embodiments of the present invention.

FIG. 15 is an illustration of an example of the applicable scope of the display apparatuses **1*a*, 1*b*, 1*c* and 1*d* according to the respective embodiments of the present invention. In FIG. 15**, the vertical axis designates a specification of a liquid crystal display mounted apparatus and the horizontal axis denotes a resolution (unit:PPI (Pixels per inch) of the liquid crystal display.

Since an apparatus showing a low processing performance leads to a low character display speed because of taking time to calculate a character outline, for carrying out the invention of the present application, it is preferable to employ an apparatus having a high processing performance. Moreover, with respect to an apparatus having a panel resolution equal to or less than approximately 120 ppi, it is desirable that a character image is displayed through the use of dot fonts, for that the processing speed (display speed) becomes higher. On the other hand, in the case of an apparatus having a panel resolution exceeding 240 ppi, since the pixel itself becomes minute, the superiority of the method (gradation display) according to the present application does not become remarkable. Therefore, the above-described methods according to the present application are particularly suitable for use in an apparatus having a pixel resolution (panel resolution) of a display means, which carries out color display, in a range between 120 ppi and 240 ppi.

The invention of the present application utilizes the following principles.

1) Color Mixture of Colors at Resolution Limit of Human Eyes

Figure 16:
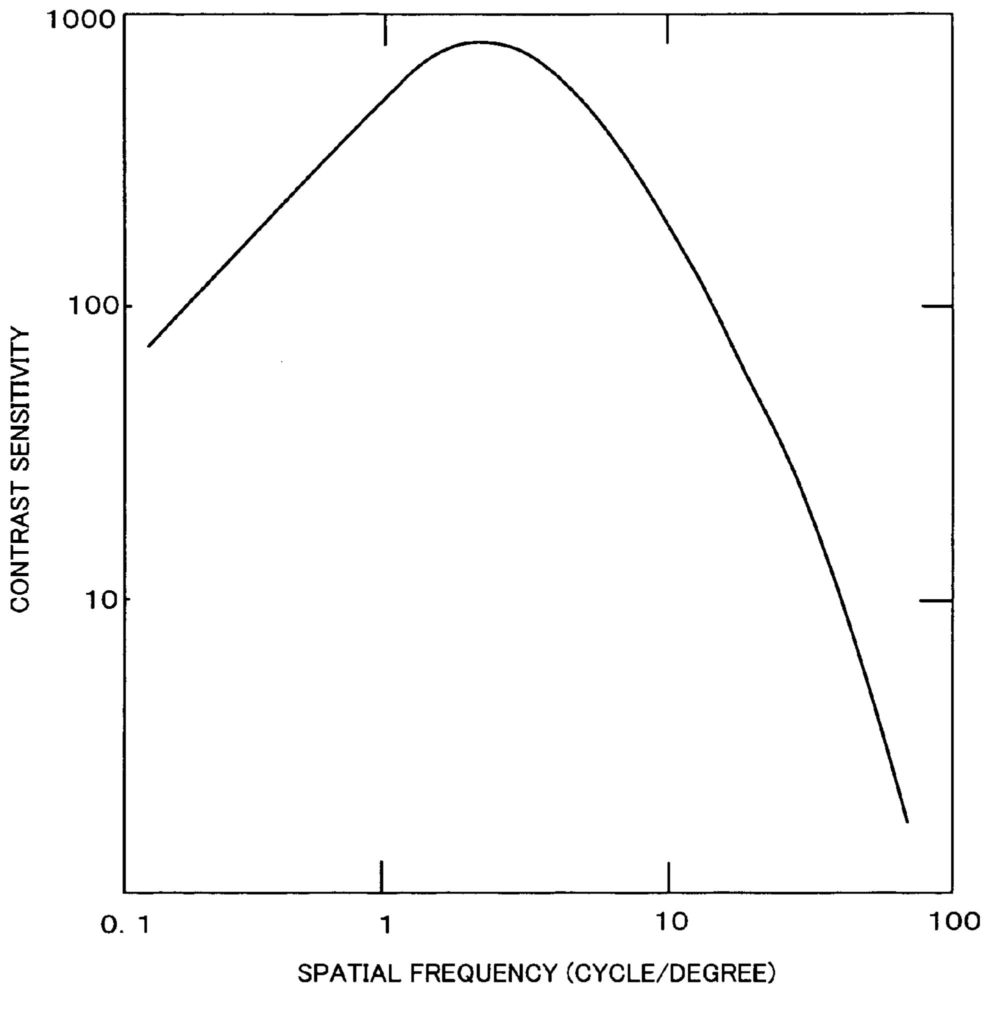
FIG. 16 is an illustration of the relationship between a contrast sensitivity and a spatial frequency.

FIG. 16 is an illustration (extracted from "Visual Information Processing", K. T Spoehr, S. W. Lehmkuhle) of the relationship between contrast sensitivity and spatial frequency.

In general, a character of approximately 5 points has an angle of view of approximately 0.3 degree when observed at an approximately common display seeing distance (for example, 300 mm). In the case of this angle of view, the separation of the RGB pixels requires a resolution that the spatial frequency is approximately $1/0.3\times7(\text{pixels})\times3=70$ (cycle/degree).

However, as shown in FIG. 16, when the spatial frequency reaches 70 (cycle/degree), the contrast sensitivity becomes below 10 so that difficulty is experienced in making the resolution on an element having a contrast sensitivity with this level through human's naked eyes. In this case, each color of RGB is not recognized individually, and the human being senses the color mixture thereof.

2) Specificity of Color Perception in Small Visual Field

It is known that, in a case in which the angle of view is equal to or less than one degree, the human eyes cannot discriminate the hue. Accordingly, in the case of observing minute RGB elements individually, an extreme difference between RGB is not recognized, and the eye's color sensation region is narrowed. Therefore, if the RGB chromatic dispersion is moderate, with respect to a display character, the lightness information is mainly observed through eyes.

From the above-mentioned principles 1) and 2), it is seen that, in the case of recognizing a high-definition character below an angle of view of 1 degree, the RGB hue information is not recognized through eye and it is mixed in color. In the invention of the present application, according to these principles, a plurality of pixels are displayed through the use of three RGB elements, thereby gradating a character.

Moreover, since only the color mixture lightness information is effective, the gradation steps are produced according to the lightness of each element.

This enables a character display without enlarging strokes of a character image, thus realizing a high-definition character display.

In the above-described respective embodiments, a luminance gradation corresponding to a display pixel is obtained on the basis of outline data to reduce the quantization error at the mapping (subpixel mapping) of a luminance value into a rectangular element coordinate system corresponding to a rectangular display element 10, thereby improving the generation accuracy. That is, a character image generated by the multi-gradation character generating unit **1*a*, 4*b*** is multi-gradated so as to improve the character production accuracy and reduce the distortion of the character image due to the quantization error and others.

In a case in which a multi-gradation character image gradated in advance is mapped in a subpixel, in general, it is considered that coloring occurs in a character. However, according to the present invention, taking note of the size of a pixel (rectangular display element 10) of a character edge portion gradated, a visual perception characteristic is applied thereto, thereby avoiding the occurrence of color unevenness.

In the case of displaying a character with a fine character with many strokes, represented by Japanese language, a portion undergoing multi-gradation processing is limited to a character edge portion. For this reason, a portion to be gradated is smaller (approximately within one pixel) than the character itself. Accordingly, there is utilized a human perception characteristic in a narrow area, i.e., "the fact that the human color perception ability lowers in a viewing angle where an object seeing angle is within several minutes".

An angle of seeing of a screen of 120 dpi at a distance of 300 mm is approximately 2.4 minutes. Since the viewing angle in seeing a gradated portion is within several minutes, the human being does not sense colors at a character edge portion but detecting only the brightness. Thus, a character image gradated previously by a rasterizer can be subpixel-mapped without generating the coloring at a character edge portion.

When a multi-gradation character image is generated directly from outline data and this character image is mapped in a rectangular element coordinate, it is possible to perform a character display having a definition higher than those of gradation fonts in a coordinate system corresponding to the rectangular display element 10. Moreover, at the same time, it is also possible to carry out the character display based on subpixel mapping through the use of a character production process including the existing gradation processing.

The present invention is not limited to the above-described embodiments, and it is also possible to make all changes and modifications of the embodiments of the invention herein which do not constitute departures from the spirit and scope of the invention.

For example, it is also appropriate that, of two modes of a normal display mode in which a display corresponding to one pixel is made through the use of N display elements 10 (basic display element set 101) and a fine display mode in which a display corresponding to a plurality of pixels (in this embodiment, corresponding to 9 pixels) is made through the use of N display elements 10 in a state where each display element 10 is associated with one or more pixels (in this embodiment, three pixels as shown in FIG. 5A), an arbitrary mode is selectively employed for the display of a character image by conducting the switching between these modes according to various conditions such as character sizes, font types and the setting by a user.

That is, for example, on the basis of the character size of a character to be displayed on the display unit 2, a decision is made as to whether or not this character size is below a standard size set in advance, and a decision as to whether a character image is to be displayed in the normal display mode or in the fine display mode is made on the basis of the decision result.

In addition, although in the above-described respective embodiments the luminance value converting unit 7 carries out the conversion processing (lightness regularizing conversion processing) to convert a luminance value to each display element 10 into a luminance value complying with the lightness characteristic of each display element 10 so that the same lightness is achievable when the R, G and B display elements 10, three in number, stand at the same luminance value (the same gradation), the present invention is not limited to this, but it is also acceptable that the element display control unit 6 displays a character image on the display unit 2 on the basis of a luminance value calculated by the element luminance value calculating unit 5 without carrying out this lightness regularizing conversion processing.

Still additionally, it is also appropriate that a luminance level modulator 15 having a function as the aforesaid luminance value converting unit 7 is provided between the image memory 13*a* and the display unit 2 in the display apparatus 1*a*, 1*b*, 1*c* or 1*d* according to each of the above-described embodiments so as to carry out the conversion processing to convert a luminance value, indicated from the element luminance value calculating unit 5 (character image generating unit 12*b*) to each display element of the display unit 2, into a luminance value meeting the lightness characteristic of each display element 10.

In this luminance level modulator 15, the function such as luminance value converting unit 7 is realized by hardware. For example, it is realized by incorporate an amplification circuit into a signal transmitted from an LCD controller (element luminance value calculating unit 5, character image generating unit 12*b*) to an LCD (color liquid crystal display; display unit 2). In this connection, it is also realizable by carry out a level correction on an RGB digital value before the LCD controller through the use of a microcomputer or the like. In the display apparatus 1*a*, 1*b*, 1*c* or 1*d* according to each of the above-described embodiments, this can reduce the processing in the calculation means 12 (for example, CPU in a computer system) and can increase the processing speed.

Yet additionally although the above-described respective embodiments takes a case of M=3 and N=3, the present invention is not limited to this, but it is also acceptable that numeric values other than 3 are used as M and N, and the present invention can be carried out while making various modifications.

Moreover, although in the above-described respective embodiments outline data is stored as font information (font data) for the formation of a multi-gradation character image in the font memory 13*a*, the present invention is not limited to this, but it is also appropriate that, for example, the character image generating unit 12*b* caches (temporarily keeps) a multi-gradation character image, produced on the basis of the outline data, in a memory (storage unit 13, or the like) and, for again displaying the same character image, the subpixel gradation processing unit 12*d* makes the display unit 2 display the multi-gradation character image cached. This can improve the character display speed.

Still moreover, it is also appropriate that the character image generating unit 12*b* (multi-gradation character producing unit 4) previously stores a multi-gradation character image, produced on the basis of the outline data, in the font memory 13*a* and the font selecting unit 12*a* acquires the multi-gradation character image stored in the font memory 13*a* and the subpixel gradation processing unit 12*d* displays this character image on the display unit 2. This can also improve the character display speed.

Yet moreover, although in the above-described embodiments the pixel values of three pixels are averaged as a method in which the subpixel gradation processing unit 12*d* calculates a luminance value of the display element 10 on the basis of the pixel values for each pixel train comprising the three pixels existing continuously, the present invention is not limited to this, but it is also possible to make all modifications which do not constitute departures from the spirit and scope of the invention. As methods, for example, it is possible to select and use a pixel value of, of the three pixels, a pixel at a specified position (for example, pixel at a central position). The employment of these methods enables the display luminance of each display element 10 to be obtained at a high speed.

Furthermore, although in the above-described respective embodiments a multi-gradation character image is expressed with 256, i.e., 0 to 255, tone levels as an example, the present invention is not limited to this, but it is also possible that the multi-gradation character image is expressed with tone levels other than the 256 tone levels.

Still furthermore, although the above-described third embodiment, as a method in which the calculation means 12 carries out a luminance distribution (weighting calculation) on the basis of the tolerance information (overlap information) between a unit rectangle provided in a state associated with the display element 10 in the rectangular element coordinate system and a character contour, a luminance of each display element 10 is obtained on the basis of the rate (overlapping rate) of an area where a character image overlaps with each rectangular element, the present invention is not limited to this, and for example, the following other methods are also employable.

(1) A re-approach distance between the center of each unit rectangle and a contour is calculated to calculate a distribution (luminance distribution) in accordance with this distance.

(2) A re-approach distance between the center of gravity of each unit rectangle and a contour is calculated to calculate a distribution in accordance with this distance.

(3) A correspondence table between the number of times of a contour intersecting with a long-side direction of each unit rectangle and a distribution value is stored in advance so that a distribution is calculated on the basis of this correspondence table. For example, a correspondence table between the number of times of intersection of a contour of a character with a longer-side direction of each unit rectangle and a distribution value (gradation value) is stored in advance, and the number of times of intersection of an outline contour of a character with a longer side of a unit rectangle is obtained so as to acquire/determine a distribution (gradation value) by referring to this correspondence table on the basis of the number of times thereof.

(4) A correspondence table between a position at which a contour intersects with a long-side direction of each unit rectangle and a distribution value is stored in advance so that a distribution is calculated on the basis of this correspondence table.

Figure 17A:
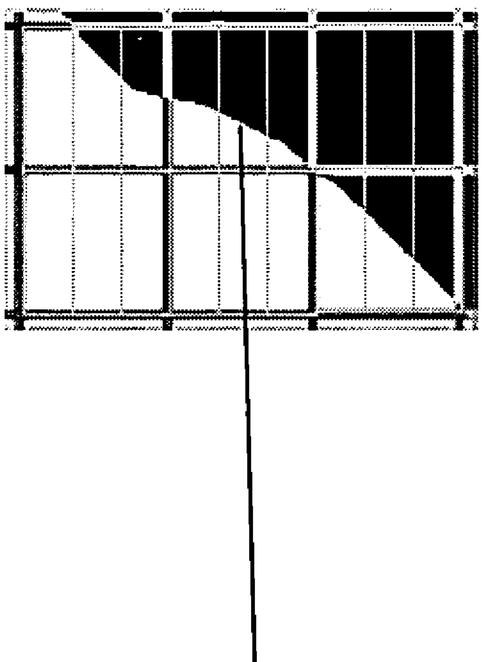
Figure 17B:
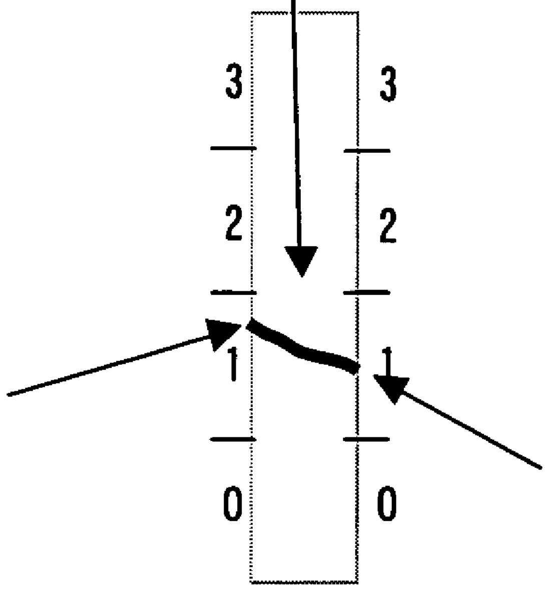
Figure 19A:
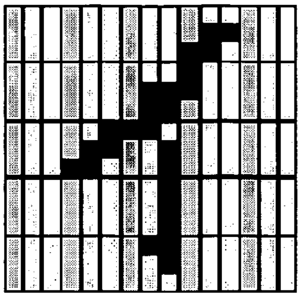
FIGS. 19A, 19B, 20A and 20B are illustrations of character distortions in a conventional character image display method.
Figure 19B:
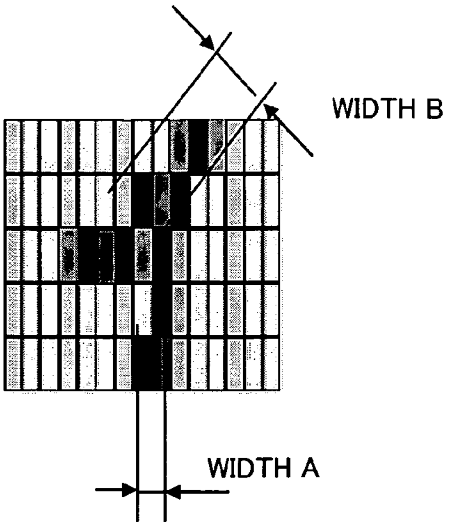
Figure 20A:
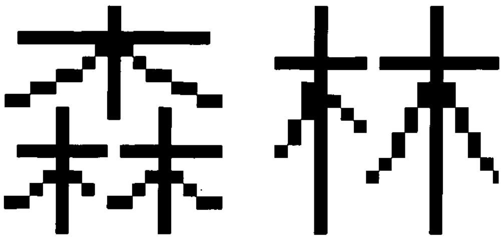
Figure 20B:
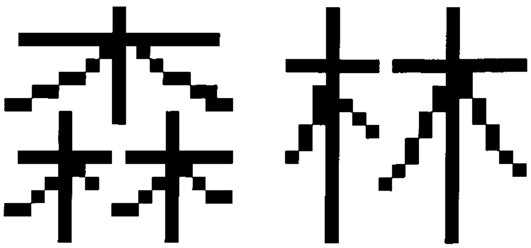

FIGS. 17A, 17B and 18 are illustrations for explaining the other luminance distribution (weighting calculation) method in the display apparatus according to the third embodiment of the present invention, and FIG. 17A is an illustration of an example of a character outline mapped in a rectangular element coordinate, FIG. 17B is an enlarged view showing a character outline position in a short-term rectangle forming a portion thereof, and FIG. 18 is an illustration of an example of a correspondence table thereof. The above-mentioned (4) method will be described with reference to these FIGS. 17A, 17B and 18.

In this method, in each unit rectangle constituting a rectangular element coordinate, each of positions where a contour of each unit rectangle intersects with the respective sides (sides along a vertical direction in the illustrations in the example shown in FIGS. 17A and 17B) is obtained on the basis of an outline coordinate (outline image) mapped in a rectangular element coordinate, and gradation values are determined on the basis of these positions.

Concretely, as shown in FIG. 17B, each of right-hand and left-hand sides (right side and left side) of a unit rectangle in its longitudinal direction is divided into a plurality of (four in the example shown in FIG. 17B) of regions, and identification information (numerals 0 to 3 in the example shown in FIG. 17B) is set at each portion thereof. Incidentally, any numerals are acceptable, provided that the number of partitions of the long side of the unit rectangle is equal to or more than 1.

In addition, a correspondence table (see FIG. 18) between positions (partitions) of intersection of an contour with long sides of each unit rectangle and distribution values (gradation values) is prepared, and distributions are calculated by referring to this correspondence table (determination of gradation values).

For example, looking at one unit rectangle in the rectangular element coordinate shown in FIG. 17A, in a unit rectangle shown in FIG. 17B, the character outline passes through the region of the partition 1 (right side value=left side value=1) with respect to the right side and the left side. Referring to the correspondence table shown in FIG. 18, the gradation value is acquired/determined as 96 on the basis of these right side value and left side value.

Still additionally, although the description of the foregoing embodiments is given about the display apparatus according to the present invention, the present invention is not limited to this, but it is also applicable to a display method of controlling a light emission state of each display element constituting a display unit for the display on the display unit, a display control apparatus for controlling a light emission of each display element constituting a display unit so as to control a display state in the display unit, a display control method of controlling a light emission state of each display element constituting a display unit to control a display state in the display unit, and a character image generating apparatus for generating a character image.

Yet additionally, in the above-described respective embodiments, the display unit 2, the display control units 3*a*, 3*b*, 3*c*, the multi-gradation character generating units 4*a*, 4*b*, the element luminance calculating unit 5, the element display control unit 6, the font selecting unit 12*a*, the character image generating unit 12*b*, the antialiasing processing unit 12*c*, the subpixel gradation processing unit 12*d*, the luminance value converting unit 7 and the rasterizer (character image producing means) 15 are realized in a manner such that a computer executes a program, and the program for realizing these functions is offered in a mode recorded in a computer-readable recording medium such as a flexible disk, CD-ROM or the like. The computer reads out the program from the recording medium and transfers it to an internal storage unit or an external storage unit for using it in a state stored therein. It is also appropriate that the program is recorded in a storage unit (recording medium) such as a magnetic disk, an optical disk, a magneto optical disk or the like and is presented from this storage unit through a communication circuit to the computer.

The disclosure of each of the embodiments of the present enables the manufacturing by a person skilled in the art.

In this embodiment, the computer signifies the concept including a hardware and an operating system, and means a hardware which operates under control of the operating system. In a case in which the operating system is unnecessary and an application program itself operates the hardware, this hardware itself corresponds to the computer. The hardware is equipped with, at least, a microprocessor such as a CPU and a means for reading out a computer program recorded in a recording medium, and in this embodiment, the calculation means 12, the display control units 3*a*, 3*b*, 3*c* and others have a function as a computer.

Moreover, as the recording medium in this embodiment, it is possible to use various types of computer-readable mediums including the above-mentioned flexible disk, CD-ROM, CD-R, CD-R/W, DVD, DVD-R, DVD-R/W, magnetic disk, optical disk and magneto optical disk and further including an IC card, ROM cartridge, magnetic tape, internal storage unit (memory such as RAM, ROM or the like), external storage unit and.

INDUSTRIAL APPLICABILITY

As described above, a display apparatus, display control apparatus, display method, display control program and computer-readable recording medium recording the same program according to the present invention are useful for the display of a relatively small character in, for example, a color liquid crystal display and, particularly, suitable for the display of a monochrome character in a portable electronic apparatus such as a portable telephone, PDA (personal Digital Assistants) or the like.

What is claimed is:

1. A display apparatus characterized by comprising:

a display unit formed by continuously and repeatedly arranging N (N signifies a natural number equal to or more than 2) rectangular display elements, capable of displaying colors different from each other, in a predetermined order in a predetermined arrangement direction in a state where a longitudinal direction of said rectangular display elements intersects perpendicularly with said arrangement direction and formed to be capable of displaying a color image in a state where said N display elements arranged in said predetermined order in said arrangement direction are associated with one pixel constituting an image which is an object of display;

a multi-gradation character generating unit for generating information on a multi-gradation character image, obtained by gradating a character edge portion, on the basis of character information on said display object character; and an element display control unit for controlling each of said rectangular display elements constituting said display unit to control a display state in said display unit, said element display control unit displaying said multi-gradation character image on the basis of information on said multi-gradation character image in a state where each of said rectangular display elements is associated with one or more pixels.

2. The display apparatus according to claim 1, wherein said multi-gradation character generating unit generates enlarged character image information on an enlarged character image for display of the same character with a size in said longitudinal direction, which is M (M signifies a natural number equal to or more than 1) times a character size of said display object character, and with a size in said arrangement direction, which is N times that of said display object character by making a display corresponding to one pixel through the use of said N rectangular display elements, an element luminance value calculating unit is provided to, on the basis of said enlarged character image information generated by said multi-gradation character generating unit, associate one of said rectangular display elements with each pixel train composed of M pixels existing continuously in said longitudinal direction in said enlarged character image, and calculate a luminance value with respect to the one of said rectangular display elements on the basis of a pixel value given to each of said M pixels, and said element display control unit controls each of said rectangular display elements in accordance with said luminance value calculated by said element luminance value calculating unit to display said enlarged character image with said character size on said display unit.

3. The display apparatus according to claim 2, wherein in said display unit, said N rectangular display elements arranged in said predetermined order in said arrangement direction form a square element having a substantial square configuration, and said multi-gradation character generating unit generates, as said enlarged character image information, image information on the same character with a size in said longitudinal direction, which is one time said character size of said display object character, and with a size in said arrangement direction, which is N times that of said display object character.

4. The display apparatus according to claim 2, wherein said element luminance value calculating unit calculates said luminance value with respect to said rectangular display element on the basis of overlap information on each of said rectangular display elements in a rectangular image coordinate system formed in a state associated with said rectangular display elements and said enlarged character image.

5. The display apparatus according to claim 4, wherein said element luminance value calculating unit calculates said luminance value with respect to said rectangular display element on the basis of area information on said enlarged character image overlapped with said rectangular display element.

6. The display apparatus according to claim 4, wherein said element luminance value calculating unit calculates said luminance value with respect to said rectangular display element on the basis of a re-approach distance between the center of each of said rectangular display elements and a contour of said enlarged character image overlapped with said rectangular display element.

7. The display apparatus according to claim 4, wherein said element luminance value calculating unit calculates said luminance value with respect to said rectangular display element on the basis of a re-approach distance between the center of gravity of each of said rectangular display elements and a contour of said enlarged character image overlapped with said rectangular display element.

8. The display apparatus according to claim 4, wherein said element luminance value calculating unit calculates said luminance value with respect to said rectangular display element on the basis of the number of times of intersection of a contour in said enlarged character image, overlapped with said rectangular display element, with a side of each of said rectangular display elements in said longitudinal direction.

9. The display apparatus according to claim 4, wherein said element luminance value calculating unit calculates said luminance value with respect to said rectangular display element on the basis of a position of intersection of a contour of said enlarged character image, overlapped with said rectangular display element, with a side of each of said rectangular display elements in said longitudinal direction.

10. The display apparatus according to claim 2, wherein a luminance value converting unit is provided to carry out conversion processing for converting said luminance value with respect to each of the rectangular display elements into a luminance value meeting a lightness characteristic of each of said rectangular display elements so that said N rectangular display elements provides the same lightness.

11. The display apparatus according to claim 1, wherein a plurality of multi-gradation character generating units are provided as the multi-gradation character generating unit, and a selection unit is provided to select an arbitrary multi-gradation character generating unit from said plurality of multi-gradation character generating units on the basis of font type information serving as said character information.

12. The display apparatus according to claim 1, wherein said element luminance value calculating unit carries out luminance distribution for each coordinate corresponding to a configuration of said display element on the basis of the calculated luminance value so as to employ, as a luminance value of a character image, a value obtained by applying a lightness balance of said display element to this distribution value.

13. The display apparatus according to claim 1, wherein a pixel resolution of said display unit is 120 ppi to 240 ppi.

14. A display control apparatus, which carries out control for displaying a character on a display unit formed by continuously and repeatedly arranging N (N signifies a natural number equal to or more than 2) rectangular display elements, capable of displaying colors different from each other, in a predetermined order in a predetermined arrangement direction in a state where a longitudinal directions of said rectangular display elements intersects perpendicularly with said arrangement direction and formed to be capable of displaying a color image in a state where said N display elements arranged in said predetermined order in said arrangement direction are associated with one pixel constituting an image which is an object of display, characterized by comprising:

a multi-gradation character generating unit for generating information on a multi-gradation character image, obtained by gradating a character edge portion, on the basis of character information on said display object character; and an element display control unit for controlling each of said rectangular display elements constituting said display unit to control a display state in said display unit, said element display control unit displaying said multi-gradation character image on the basis of information on said multi-gradation character image in a state where each of said rectangular display elements is associated with one or more pixels.

15. The display control apparatus according to claim 14 wherein said multi-gradation character generating unit generates enlarged character image information on an enlarged character image for display of the same character with a size in said longitudinal direction, which is M (M signifies a natural number equal to or more than 1) times a character size of said display object character, and with a size in said arrangement direction, which is N times that of said display object character by making a display corresponding to one pixel through the use of said N rectangular display elements, an element luminance value calculating unit is provided to, on the basis of said enlarged character image information generated by said multi-gradation character generating unit, associate one of said rectangular display elements with each pixel train composed of M pixels existing continuously in said longitudinal direction in said enlarged character image, and calculate a luminance value with respect to the one of said rectangular display elements on the basis of a pixel value given to each of said M pixels, and said element display control unit controls each of said rectangular display elements in accordance with said luminance value calculated by said element luminance value calculating unit to display said enlarged character image with said character size on said display unit.

16. The display control apparatus according to claim 15, wherein in said display unit, said N rectangular display elements arranged in said predetermined order in said arrangement direction form a square element having a substantial square configuration, and said multi-gradation character generating unit generates, as said enlarged character image information, image information on the same character with a size in said longitudinal direction, which is one time said character size of said display object character, and with a size in said arrangement direction, which is N times that of said display object character.

17. The display control apparatus according to claim 15, wherein said element luminance value calculating unit calculates said luminance value with respect to said rectangular display element on the basis of overlap information on each of said rectangular display elements in a rectangular image coordinate system formed in a state associated with said rectangular display elements and said enlarged character image.

18. The display control apparatus according to claim 17, wherein said element luminance value calculating unit calculates said luminance value with respect to said rectangular display element on the basis of area information on said enlarged character image overlapped with said rectangular display element.

19. The display control apparatus according to claim 17, wherein said element luminance value calculating unit calculates said luminance value with respect to said rectangular display element on the basis of a position of intersection of a contour of said enlarged character image, overlapped with said rectangular display element, with a side of each of said rectangular display elements in said longitudinal direction.

20. The display control apparatus according to claim 15, wherein a luminance value converting unit is provided to carry out conversion processing for converting said luminance value with respect to each of said rectangular display elements into a luminance value meeting a lightness characteristic of each of said rectangular display elements so that said N rectangular display elements provides the same lightness.

21. The display control apparatus according to claim 14, wherein a plurality of multi-gradation character generating units are provided as said multi-gradation character generating unit, and a selection unit is provided to select an arbitrary multi-gradation character generating unit from said plurality of multi-gradation character generating units on the basis of font type information serving as said character information.

22. The display control apparatus according to claim 14, wherein said element luminance value calculating unit carries out luminance distribution for each coordinate corresponding to a configuration of said display element so as to employ, as said luminance value of said character image, a value obtained by applying a lightness balance of said display element to this distribution value.

23. The display control apparatus according to claim 14, wherein a pixel resolution of said display unit is 120 ppi (pixels per inch) to 240 ppi.

24. A display method of displaying a character on a display unit formed by continuously and repeatedly arranging N (N signifies a natural number equal to or more than 2) rectangular display elements, capable of displaying colors different from each other, in a predetermined order in a predetermined arrangement direction in a state where a longitudinal direction of said rectangular display elements intersects perpendicularly with said arrangement direction and formed to be capable of displaying a color image in a state where said N display elements arranged in said predetermined order in said arrangement direction are associated with one pixel constituting an image which is an object of display, characterized by comprising:

a multi-gradation character generating step of generating information on a multi-gradation character image, obtained by gradating a character edge portion, on the basis of character information on said display object character; and an element display control step of controlling each of said rectangular display elements constituting said display unit to control a display state in said display unit, in said element display control step, said multi-gradation character image being displayed on the basis of information on said multi-gradation character image in a state where each of said rectangular display elements is associated with one or more pixels.

25. The display method according to claim 24, wherein in said multi-gradation character generating step, enlarged character image information on an enlarged character image is generated for display of the same character with a size in said longitudinal direction, which is M (M signifies a natural number equal to or more than 1) times a character size of said display object character, and with a size in said arrangement direction, which is N times that of said display object character, by making a display corresponding to one pixel through the use of said N rectangular display elements, and an element luminance value calculating step is provided to, on the basis of said enlarged character image information generated by said multi-gradation character generating step, associate one of said rectangular display elements with each pixel train composed of M pixels existing continuously in said longitudinal direction in said enlarged character image, and calculate a luminance value with respect to the one of said rectangular display elements on the basis of a pixel value given to each of said M pixels, and in said element display control step, each of said rectangular display elements is controlled in accordance with said luminance value calculated in said element luminance value calculating step to display said enlarged character image with said character size on said display unit.

26. The display method according to claim 25, wherein in said display unit, said N rectangular display elements arranged in said predetermined order in said arrangement direction form a square element having a substantial square configuration, and in said multi-gradation character generating step, image information on the same character with a size in said longitudinal direction, which is one time said character size of said display object character, and with a size in said arrangement direction, which is N times that of said display object character is generated as said enlarged character image information.

27. The display method according to claim 25, wherein in said element luminance value calculating step, said luminance value with respect to said rectangular display element is calculated on the basis of overlap information on each of said rectangular display elements in a rectangular image coordinate system formed in a state associated with said rectangular display elements and said enlarged character image.

28. The display method according to claim 27, wherein in said element luminance value calculating step, said luminance value with respect to said rectangular display element is calculated on the basis of area information on said enlarged character image overlapped with said rectangular display element.

29. The display method according to claim 27, wherein in said element luminance value calculating step, said luminance value with respect to said rectangular display element is calculated on the basis of a position of intersection of a contour of said enlarged character image, overlapped with said rectangular display element, with a side of each of said rectangular display elements in said longitudinal direction.

30. The display method according to claim 25, wherein a luminance value converting step is provided to carry out conversion processing for converting said luminance value with respect to each of said rectangular display elements into a luminance value meeting a lightness characteristic of each of said rectangular display elements so that said N rectangular display elements provides the same lightness.

31. The display method according to claim 24, wherein a plurality of multi-gradation character generating means are provided for realizing said multi-gradation character generating step, and a selection step is provided to select arbitrary multi-gradation character generating means from said plurality of multi-gradation character generating means on the basis of font type information serving as said character information.

32. The display method according to claim 24, wherein in said element luminance value calculating step, luminance distribution is carried out for each coordinate corresponding to a configuration of said display element so as to employ, as said luminance value of said character image, a value obtained by applying a lightness balance of said display element to this distribution value.

33. The display method according to claim 24, wherein a pixel resolution of said display unit is 120 ppi (pixels per inch) to 240 ppi.

34. A computer-readable recording medium recording a display control program, which controls display of a character on a display unit formed by continuously and repeatedly arranging N (N signifies a natural number equal to or more than 2) rectangular display elements, capable of displaying colors different from each other, in a predetermined order in a predetermined arrangement direction in a state where a longitudinal direction of said rectangular display elements intersects perpendicularly with said arrangement direction and formed to be capable of displaying a color image in a state where said N display elements arranged in said predetermined order in said arrangement direction are associated with one pixel constituting an image which is an object of display, characterized in that said display program makes a computer function as:

a multi-gradation character generating unit for generating information on a multi-gradation character image, obtained by gradating a character edge portion, on the basis of character information on said display object character; and an element display control unit for controlling each of said rectangular display elements constituting said display unit to control a display state in said display unit, and further makes said computer fulfill a function so that said element display control unit displays said multi-gradation character image on the basis of information on said multi-gradation character image in a state where each of said rectangular display elements is associated with one or more pixels.

* * * * *